(12) United States Patent
Lainema et al.

(10) Patent No.: US 9,432,699 B2
(45) Date of Patent: Aug. 30, 2016

(54) METHODS, APPARATUSES AND COMPUTER PROGRAMS FOR VIDEO CODING

(75) Inventors: Jani Lainema, Tampere (FI); Kemal Ugur, Tampere (FI)

(73) Assignee: Nokia Technologies Oy, Espoo (FI)

( * ) Notice: Subject to any disclaimer, the term of this patent is extended or adjusted under 35 U.S.C. 154(b) by 704 days.

(21) Appl. No.: 13/475,069

(22) Filed: May 18, 2012

(65) Prior Publication Data

US 2012/0294357 A1    Nov. 22, 2012

Related U.S. Application Data

(60) Provisional application No. 61/487,662, filed on May 18, 2011.

(51) Int. Cl.

| | |
|---|---|
| H04N 7/32 | (2006.01) |
| H04N 19/82 | (2014.01) |
| H04N 19/159 | (2014.01) |
| H04N 19/176 | (2014.01) |
| H04N 19/46 | (2014.01) |
| H04N 19/61 | (2014.01) |
| H04N 19/593 | (2014.01) |
| H04N 19/117 | (2014.01) |
| H04N 19/186 | (2014.01) |
| H04N 19/80 | (2014.01) |
| H04N 19/597 | (2014.01) |

(52) U.S. Cl.
CPC ............ *H04N 19/82* (2014.11); *H04N 19/117* (2014.11); *H04N 19/159* (2014.11); *H04N 19/176* (2014.11); *H04N 19/186* (2014.11); *H04N 19/46* (2014.11); *H04N 19/593* (2014.11); *H04N 19/61* (2014.11); *H04N 19/80* (2014.11); *H04N 19/597* (2014.11)

(58) Field of Classification Search
None
See application file for complete search history.

(56) References Cited

U.S. PATENT DOCUMENTS

| | | | | |
|---|---|---|---|---|
| 2006/0126727 A1* | 6/2006 | Kim | ...................... | H04N 19/105 375/240.03 |
| 2006/0146930 A1* | 7/2006 | Kim | ...................... | H04N 19/105 375/240.03 |

(Continued)

OTHER PUBLICATIONS

Sugimoto et al., "CE6.f: LUT-Based Adaptive Filtering On Intra Prediction Samples", Joint Collaborative Team on Video Coding (JCT-VC) of ITU-T SG16 WP3 and ISO/IEC JTC1/SC29/WG11, JCTVC-E069, Mar. 16-23, 2011, pp. 1-12.

(Continued)

*Primary Examiner* — Frederick Bailey
(74) *Attorney, Agent, or Firm* — Harrington & Smith

(57) ABSTRACT

There is disclosed apparatuses, methods and computer programs for video coding. The filtering process to be applied to intra predicted sample values is selected and adapted based on the characteristics of the sample prediction process. According to some embodiments an angularity information and pixel values for filtering by a filter are received. The angularity information is used to adapt the filter. The adapting may comprise selecting a filter algorithm and/or filter coefficients. The selected pixels are then filtered by the adapted filter.

14 Claims, 15 Drawing Sheets

(56) References Cited

U.S. PATENT DOCUMENTS

| | | | | |
|---|---|---|---|---|
| 2006/0159361 | A1* | 7/2006 | Hasegawa | G06T 5/002 382/261 |
| 2007/0253483 | A1* | 11/2007 | Lee | H04N 19/176 375/240.12 |
| 2008/0031331 | A1* | 2/2008 | Hong | H04N 19/159 375/240.12 |
| 2010/0284458 | A1* | 11/2010 | Andersson et al. | 375/240.03 |
| 2010/0309977 | A1* | 12/2010 | Andersson et al. | 375/240.12 |
| 2011/0170594 | A1* | 7/2011 | Budagavi et al. | 375/240.13 |
| 2011/0200103 | A1* | 8/2011 | Kim | H04N 19/159 375/240.03 |

OTHER PUBLICATIONS

"High Efficiency Video Coding", Working Draft 3 software, Retrieved on Jun. 5, 2013, Webpage available at: https://hevc.hhi.fraunhofer.de/svn/svn_HEVCSoftware/tags/HM-3.

"Video Coding For Low Bit Rate Communication", Series H: Audiovisual And Multimedia Systems, Infrastructure of audiovisual services—Coding of moving video, ITU-T Recommendation H.263, Jan. 2005, 226 pages.

"Advanced Video Coding For Generic Audiovisual Services", Series H: Audiovisual And Multimedia Systems, Infrastructure of audiovisual services—Coding of moving video, ITU-T Recommendation H.264, Mar. 2010, 676 pages.

* cited by examiner

METHODS, APPARATUSES AND COMPUTER PROGRAMS FOR VIDEO CODING

TECHNICAL FIELD

The present invention relates to an apparatus, a method and a computer program for encoding and decoding.

BACKGROUND INFORMATION

A video codec may comprise an encoder which transforms input video into a compressed representation suitable for storage and/or transmission and a decoder that can uncompress the compressed video representation back into a viewable form, or either one of them. The encoder may discard some information in the original video sequence in order to represent the video in a more compact form, for example at a lower bit rate.

Many hybrid video codecs, operating for example according to the International Telecommunication Union's ITU-T H.263 and H.264 coding standards, encode video information in two phases. In the first phase, pixel values in a certain picture area or "block" are predicted. These pixel values can be predicted, for example, by motion compensation mechanisms, which involve finding and indicating an area in one of the previously encoded video frames (or a later coded video frame) that corresponds closely to the block being coded. Additionally, pixel values can be predicted by spatial mechanisms which involve finding and indicating a spatial region relationship.

Prediction approaches using image information from a previous (or a later) image can also be called as Inter prediction methods, and prediction approaches using image information within the same image can also be called as Intra prediction methods.

The second phase is one of coding the error between the predicted block of pixels and the original block of pixels. This may be accomplished by transforming the difference in pixel values using a specified transform. This transform may be a Discrete Cosine Transform (DCT) or a variant thereof. After transforming the difference, the transformed difference is quantized and entropy encoded.

By varying the fidelity of the quantization process, the encoder can control the balance between the accuracy of the pixel representation, (in other words, the quality of the picture) and the size of the resulting encoded video representation (in other words, the file size or transmission bit rate).

The decoder reconstructs the output video by applying a prediction mechanism similar to that used by the encoder in order to form a predicted representation of the pixel blocks (using the motion or spatial information created by the encoder and stored in the compressed representation of the image) and prediction error decoding (the inverse operation of the prediction error coding to recover the quantized prediction error signal in the spatial domain).

After applying pixel prediction and error decoding processes the decoder combines the prediction and the prediction error signals (the pixel values) to form the output video frame.

The decoder (and encoder) may also apply additional filtering processes in order to improve the quality of the output video before passing it for display and/or storing as a prediction reference for the forthcoming frames in the video sequence.

In many video codecs, the motion information is indicated by motion vectors associated with each motion compensated image block. Each of these motion vectors represents the displacement of the image block in the picture to be coded (in the encoder) or decoded (at the decoder) and the prediction source block in one of the previously coded or decoded images (or pictures). In order to represent motion vectors efficiently, motion vectors may be coded differentially with respect to block specific predicted motion vector. In many video codecs, the predicted motion vectors are created in a predefined way, for example by calculating the median of the encoded or decoded motion vectors of the adjacent blocks.

In many video codecs the prediction residual after motion compensation is first transformed with a transform kernel (like DCT) and then coded. The reason for this is that often there still exists some correlation among the residual and transform can in many cases help reduce this correlation and provide more efficient coding.

Many video encoders utilize the Lagrangian cost function to find optimal coding modes, for example the desired macro block mode and associated motion vectors. This type of cost function uses a weighting factor or $\lambda$ to tie together the exact or estimated image distortion due to lossy coding methods and the exact or estimated amount of information required to represent the pixel values in an image area.

This may be represented by the equation:

$$C = D + \lambda R \qquad (1)$$

where C is the Lagrangian cost to be minimised, D is the image distortion (for example, the mean-squared error between the pixel values in original image block and in coded image block) with the mode and motion vectors currently considered, $\lambda$ is a Lagrangian coefficient and R is the number of bits needed to represent the required data to reconstruct the image block in the decoder (including the amount of data to represent the candidate motion vectors).

In many video codecs the Intra coded image blocks are predicted by directionally extrapolating samples of one or more of the already coded or decoded neighboring image blocks. The direction to be used in the prediction process is indicated in the bitstream and the decoder generates predicted samples by copying sample values from the indicated direction. The sample values to be copied may possibly be interpolated sample values. FIGS. 8a and 8b illustrate this process. In FIG. 9a the prediction for the top row of the block is depicted and in FIG. 9b the prediction for the left-most column of the block is depicted in the case of +45 degree vertical prediction. This procedure creates continuous pixel surface on the border of the image block to be decoded and the block in the direction where the pixel values are predicted from. However, it may not be possible to provide prediction that is continuous in other borders of the image block. FIG. 9c illustrates a potential discontinuity along one of the borders of the image block after directional intra prediction has been applied.

SUMMARY

The present invention introduces a method which may apply prediction sample filtering adaptively based on directionality of the applied spatial intra prediction mode. Both the location of pixels to be filtered and input samples to the filtering process may be selected based on the angularity of the directional intra prediction to provide prediction output with desired characteristics. This way the approach may be able to generate continuous prediction sample surface along multitude of prediction block boundaries improving both compression efficiency and visual appearance of the decoded video content. In an example mode of operation information of the angularity is received i.e. the direction of the spatial intra-prediction. That information is used to determine how to adapt the directional filtering which will be performed on the selected pixels.

According to a first aspect of the present invention there is provided an apparatus comprising:
 a. a first input adapted to receive angularity information;
 b. a second input adapted to receive pixel values for filtering; and
 c. a filtering element adapted to perform filtering of the selected pixel values;
 d. a coefficient selector adapted to adapt the filtering on the basis of the angularity.

In some embodiments the coefficient selector is adapted to select a filter algorithm for the filtering element.

In some embodiments the coefficient selector is further adapted to select one or more coefficients for the filtering element.

The apparatus of the first embodiment may further comprise one or more thresholds, wherein the coefficient selector is adapted to compare the angularity with said one or more thresholds to adapt the filtering.

In some embodiments the received pixel values are intra-predicted pixel values.

In some embodiments the angularity also indicates whether the intra-prediction used to obtain the intra-predicted pixel values is a horizontal prediction or a vertical prediction.

In some embodiments the angularity is between −45 degrees and 45 degrees with respect to a horizontal or a vertical direction.

In some embodiments the filtering element uses an N-tap filter.

In some embodiments the adaptation comprises selecting values for at least one of the following:
 a filter tap,
 a filter offset.

In some embodiments the pixel values for filtering are pixels of the row or column of the current block closest to an already encoded neighboring block.

In some embodiments the pixel values for filtering are pixels of the column of the current block closest to an already encoded neighboring block, if the intra-prediction is vertical prediction.

In some embodiments the pixel values for filtering are pixels of the row of the current block closest to an already encoded neighboring block, if the intra-prediction is horizontal prediction.

In some embodiments the pixel values for filtering are intra-predicted pixels which have been transform coded and inverse transform coded before the filtering.

According to a second aspect of the present invention there is provided a method comprising:
 a. receiving angularity information;
 b. receiving pixel values for filtering by a filter; and
 c. adapting the filter on the basis of the angularity;
 d. filtering the pixels values by the adapted filter.

According to a third aspect of the present invention there is provided a computer readable storage medium stored with code thereon for use by an apparatus, which when executed by a processor, causes the apparatus to perform:
 a. receive angularity information;
 b. receive pixel values for filtering by a filter; and
 c. adapt the filter on the basis of the angularity;
 d. filter the pixels values by the adapted filter.

According to a fourth aspect of the present invention there is provided at least one processor and at least one memory, said at least one memory stored with code thereon, which when executed by said at least one processor, causes an apparatus to perform:
 a. receive angularity information;
 b. receive pixel values for filtering by a filter; and
 c. adapt the filter on the basis of the angularity;
 d. filter the pixels values by the adapted filter.

According to a fifth aspect of the present invention there is provided an apparatus comprising:
 a. means for receiving angularity information;
 b. means for receiving pixel values for filtering; and
 c. means for filtering the selected pixel values;
 d. means for adapting the filtering on the basis of the angularity.

According to a sixth aspect of the present invention there is provided an encoder comprising:
 a. a first input adapted to receive angularity information;
 b. a second input adapted to receive pixel values for filtering; and
 c. a filtering element adapted to perform filtering of the selected pixel values;
 d. a coefficient selector adapted to adapt the filtering on the basis of the angularity.

According to a tenth aspect of the present invention there is provided a decoder comprising:
 a. a first input adapted to receive angularity information;
 b. a second input adapted to receive pixel values for filtering; and
 c. a filtering element adapted to perform filtering of the selected pixel values;
 d. a coefficient selector adapted to adapt the filtering on the basis of the angularity.

The invention can be implemented in number of ways. For example, the filtering may utilized or not for a specific block, a set of blocks, a specific picture, a set of pictures or a complete video sequence. In other words, the intra-prediction filtering can be switched on or off on a block-by-block basis, on a image-by-image basis, etc. Then it may be sufficient to transmit the indication once for each block. In situations in which the intra-prediction filtering is always applied for intra-predicted blocks, no indication need to be transmitted and the decoder can be set to operate so that it applies the intra-prediction filtering for each intra-predicted block. Otherwise, it may be necessary to signal the use of the intra-prediction filtering to the dedoder or the decoder may determine it e.g. by examining pixels of the predicted block and/or pixels of the neighboring block(s) of the current block. Signaling of the possible usage of the intra-prediction filtering can take place in different ways, e.g. it does not have to be part of the sequence parameter set, but can be e.g. signaled out of band.

Some embodiments of the present invention allow more efficient compression of video information and may provide improved visual quality of the decoded video.

DESCRIPTION OF THE DRAWINGS

For better understanding of the present invention, reference will now be made by way of example to the accompanying drawings in which.

FIG. 5 shows a flow diagram showing the operation of an embodiment of the invention with respect to the encoder as shown in FIG. 4a;

DETAILED DESCRIPTION OF SOME EXAMPLE EMBODIMENTS

Figure 1:
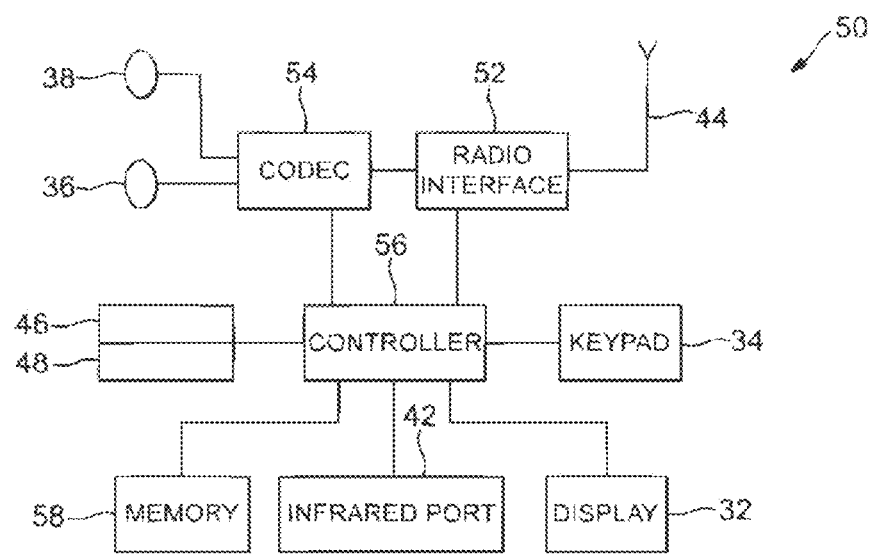
FIG. 1 shows schematically an electronic device employing some embodiments of the invention.
Figure 2:
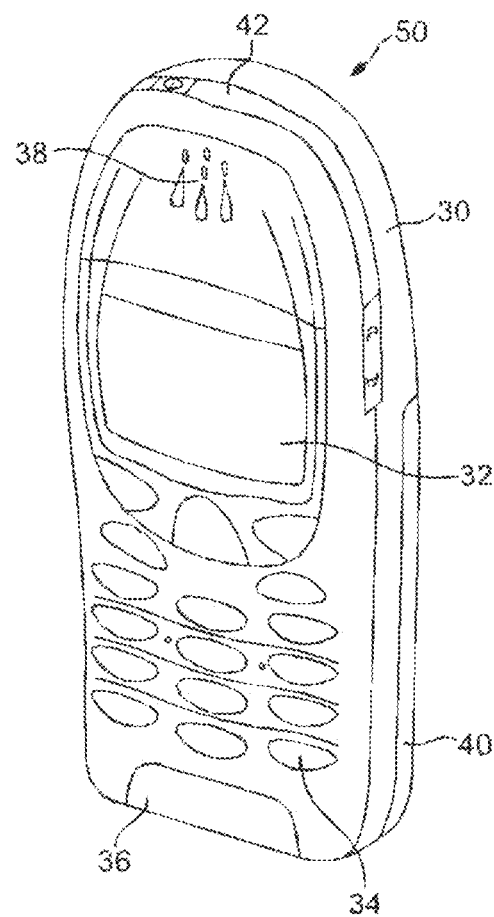
FIG. 2 shows schematically a user equipment suitable for employing some embodiments of the invention.

The following describes in further detail suitable apparatus and possible mechanisms for the provision of reducing information to be transmitted in video coding systems and more optimal codeword mappings in some embodiments. In this regard reference is first made to FIG. 1 which shows a schematic block diagram of an exemplary apparatus or electronic device 50, which may incorporate a codec according to an embodiment of the invention.

The electronic device 50 may for example be a mobile terminal or user equipment of a wireless communication system. However, it would be appreciated that embodiments of the invention may be implemented within any electronic device or apparatus which may require encoding and decoding or encoding or decoding video images.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The apparatus may further comprise an infrared port 42 for short range line of sight communication to other devices. In other embodiments the apparatus 50 may further comprise any suitable short range communication solution such as for example a Bluetooth wireless connection or a USB/firewire wired connection.

The apparatus 50 may comprise a controller 56 or processor for controlling the apparatus 50. The controller 56 may be connected to memory 58 which in embodiments of the invention may store both data in the form of image and audio data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a UICC and UICC reader for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 44 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera capable of recording or detecting individual frames which are then passed to the codec 54 or controller for processing. In some embodiments of the invention, the apparatus may receive the video image data for processing from another device prior to transmission and/or storage. In some embodiments of the invention, the apparatus 50 may receive either wirelessly or by a wired connection the image for coding/decoding.

Figure 3:
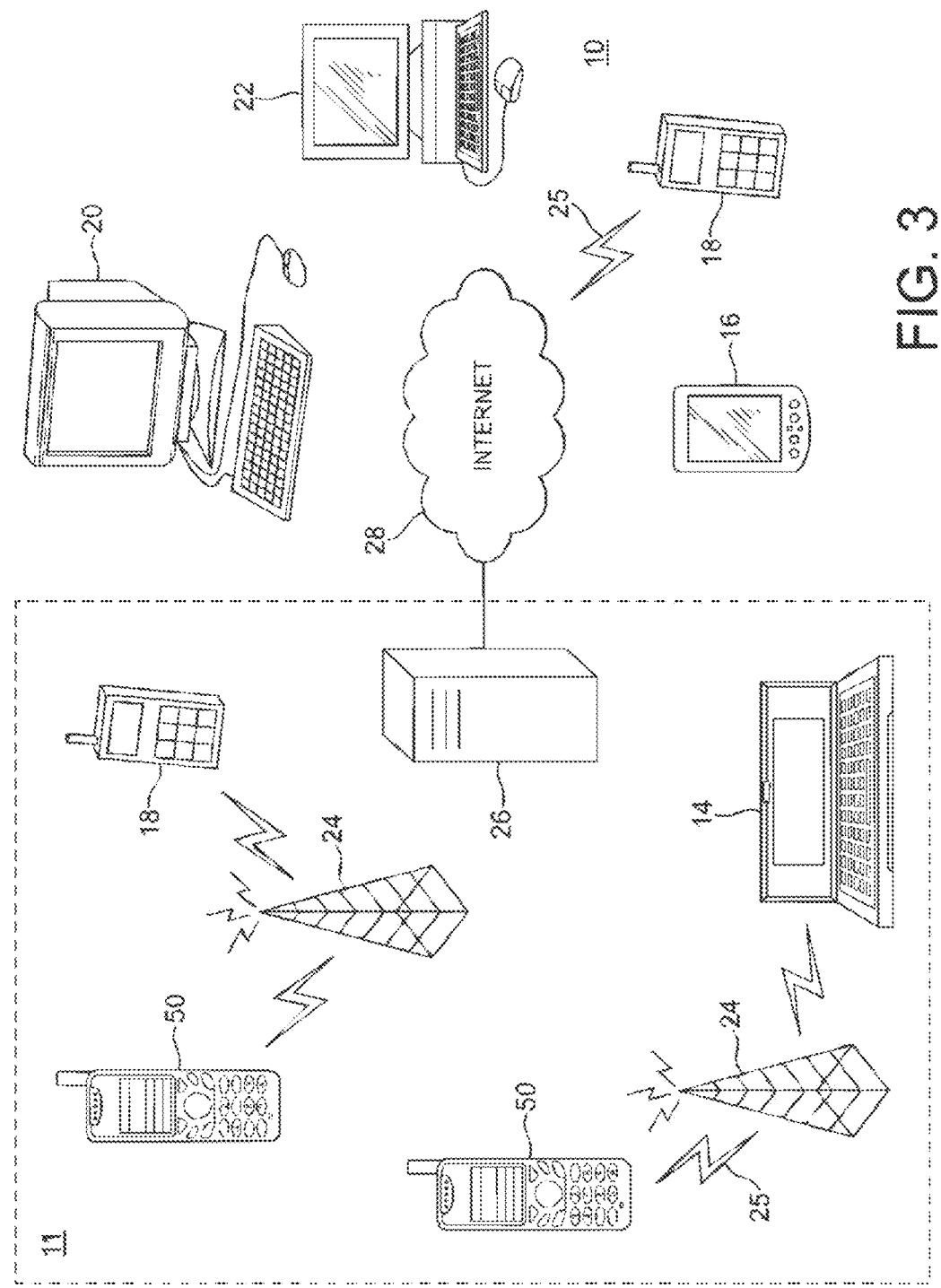
FIG. 3 further shows schematically electronic devices employing embodiments of the invention connected using wireless and wired network connections.

With respect to FIG. 3, an example of a system within which embodiments of the present invention can be utilized is shown. The system 10 comprises multiple communication devices which can communicate through one or more networks. The system 10 may comprise any combination of wired or wireless networks including, but not limited to a wireless cellular telephone network (such as a GSM, UMTS, CDMA network etc), a wireless local area network (WLAN) such as defined by any of the IEEE 802.x standards, a Bluetooth personal area network, an Ethernet local area network, a token ring local area network, a wide area network, and the Internet.

The system 10 may include both wired and wireless communication devices or apparatus 50 suitable for implementing embodiments of the invention.

For example, the system shown in FIG. 3 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24. The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11 and any similar wireless communication technology. A communications device involved in implementing various embodiments of the present invention may communicate using various media including, but not limited to, radio, infrared, laser, cable connections, and any suitable connection.

Figure 4A:
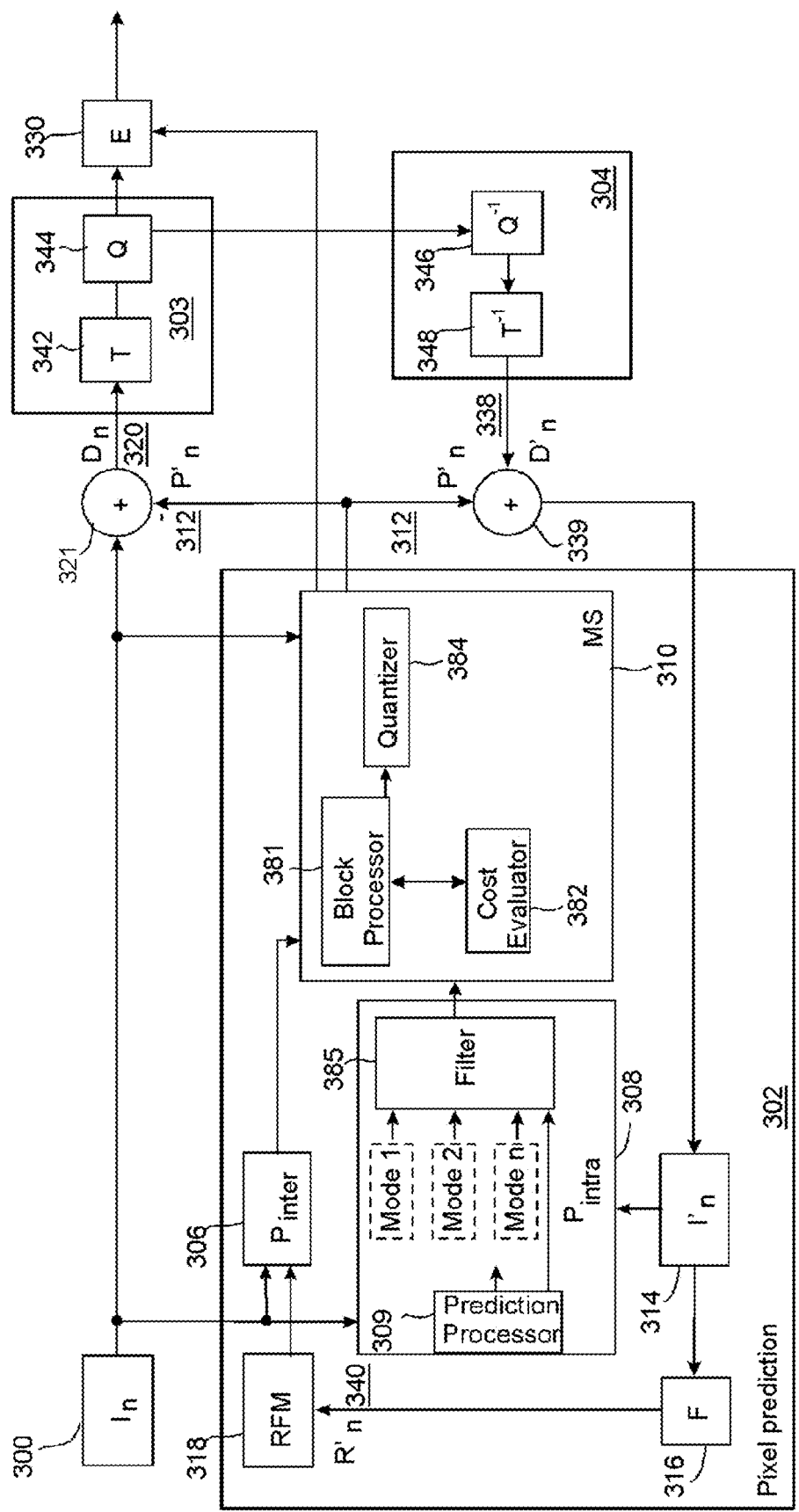
FIG. 4a shows schematically an embodiment of the invention as incorporated within an encoder.
Figure 5:
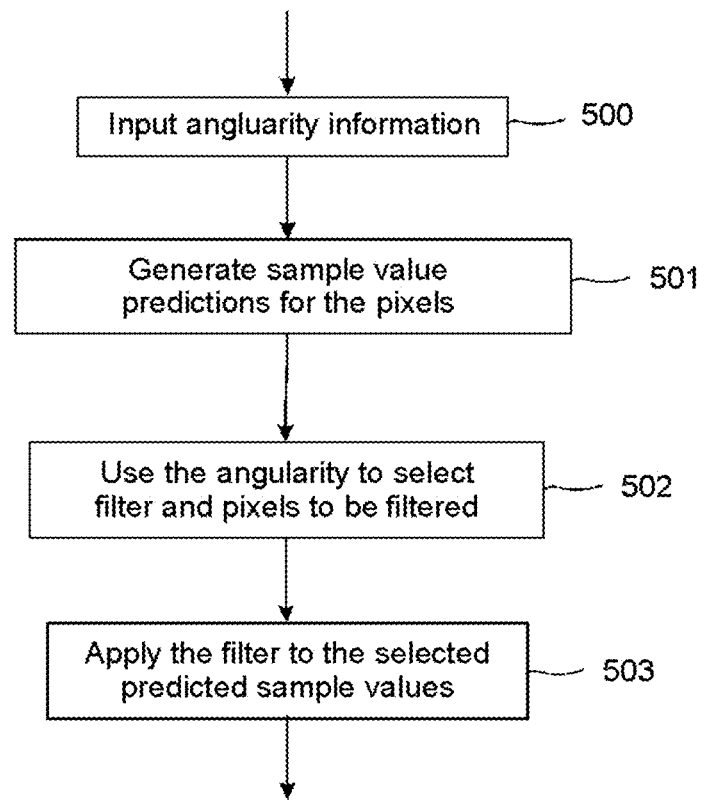

With respect to FIG. 4a, a block diagram of a video encoder suitable for carrying out embodiments of the invention is shown. Furthermore, with respect to FIG. 5, the operation of the encoder exemplifying embodiments of the invention specifically with respect to the filtering of pixel values is shown as a flow diagram.

Figure 4B:
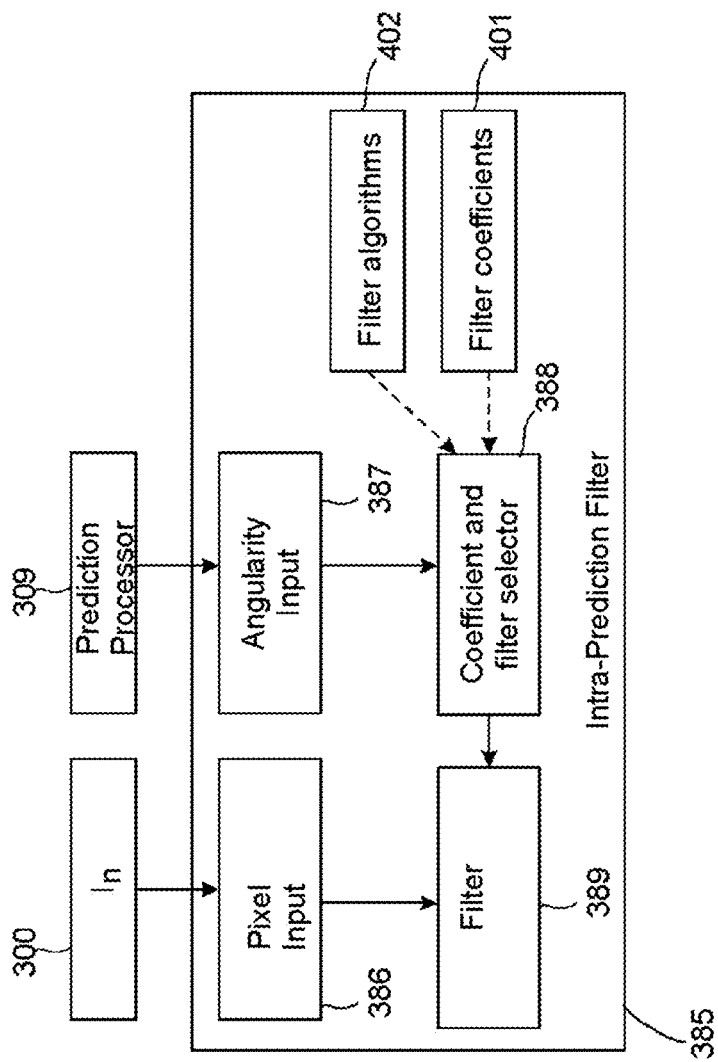
FIG. 4b shows schematically an embodiment of an intra predictor according to some embodiments of the invention.

FIG. 4a shows the encoder as comprising a pixel predictor 302, prediction error encoder 303 and prediction error decoder 304. FIG. 4a also shows an embodiment of the pixel predictor 302 as comprising an inter-predictor 306, an intra-predictor 308, a mode selector 310, a preliminary reconstructed image filter 316, and a reference frame memory 318. The mode selector 310 comprises a block processor 381 and a cost evaluator 382. The mode selector 310 may also comprise a quantizer 384. FIG. 4a also depicts an embodiment of the intra-predictor 308 which comprises a plurality of different intra-prediction modes Mode 1, Mode 2, . . . , Mode n and may also comprise a prediction processor 309. The intra-predictor 308 may comprise an intra-prediction filter 385 having a first input 386 for receiving angularity information, a second input 387 for receiving pixel values for the filtering, a coefficient selector 388, and a filtering element 389 for performing the filtering operations. Some further details of an embodiment of the intra-predictor 308 are depicted in FIG. 4b.

The pixel predictor 302 receives the image 300 to be encoded at both the inter-predictor 306 (which determines the difference between the image and a motion compensated reference frame 318) and the intra-predictor 308 (which determines a prediction for an image block based only on the already processed parts of a current frame or a picture). The output of both the inter-predictor and the intra-predictor are passed to the mode selector 310. The intra-predictor 308 may have more than one intra-prediction modes. Hence, each mode may perform the intra-prediction and provide the predicted signal to the mode selector 310. The mode selector 310 also receives a copy of the image 300.

The block processor 381 determines which encoding mode to use to encode the current block. If the block processor 381 decides to use an inter-prediction mode it will pass the output of the inter-predictor 306 to the output of the mode selector 310. If the block processor 381 decides to use an intra-prediction mode it will pass the output of one of the intra-predictor modes to the output of the mode selector 310.

According to some example embodiments the pixel predictor 302 operates as follows. The inter predictor 306 and the intra prediction modes 308 perform the prediction of the current block to obtain predicted pixel values of the current block. The inter predictor 306 and the intra prediction modes 308 may provide the predicted pixel values of the current block to the block processor 381 for analyzing which prediction to select. In addition to the predicted values of the current block, the block processor 381 may, in some embodiments, receive an indication of a directional intra prediction mode from the intra prediction modes.

The block processor 381 examines whether to select the inter prediction mode or the intra prediction mode. The block processor 381 may use cost functions such as the equation (1) or some other methods to analyze which encoding method gives the most efficient result with respect to a certain criterion or criteria. The selected criteria may include coding efficiency, processing costs and/or some other criteria. The block processor 381 may examine the prediction for each directionality i.e. for each intra prediction mode and inter prediction mode and calculate the cost value for each intra prediction mode and inter prediction mode, or the block processor 381 may examine only a subset of all available prediction modes in the selection of the prediction mode.

In some embodiments, the available intra prediction modes include a horizontal mode, a vertical mode, a number of diagonal modes and a DC mode. In the horizontal mode pixel values for a current block are predicted by using pixel values of the neighboring block in the horizontal direction e.g. the neighboring block on the left side of the current block. An example of this is illustrated in FIG. 8b. In the vertical mode pixel values for a current block are predicted by using pixel values of the neighboring block in the vertical direction e.g. the neighboring block above the current block. An example of this is illustrated in FIG. 8c. In the diagonal mode pixel values for a current block are predicted by using pixel values of the neighboring block in a "diagonal" direction. An example of this situation are illustrated in FIG. 8d.

In some embodiments there may be even tenths of available prediction modes, for example over 40 different prediction modes.

Figure 8A:
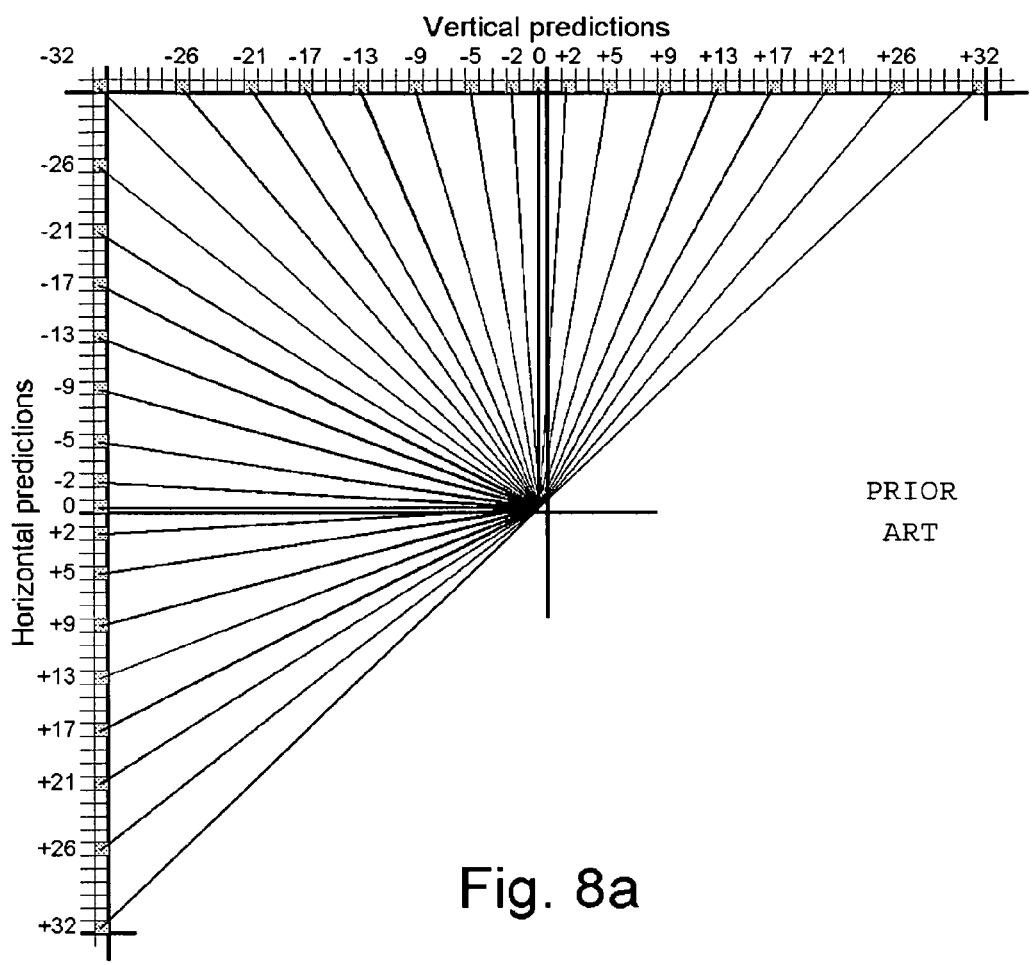
FIG. 8a depicts an example of available prediction directions for one mode of implementation.
Figure 8B:
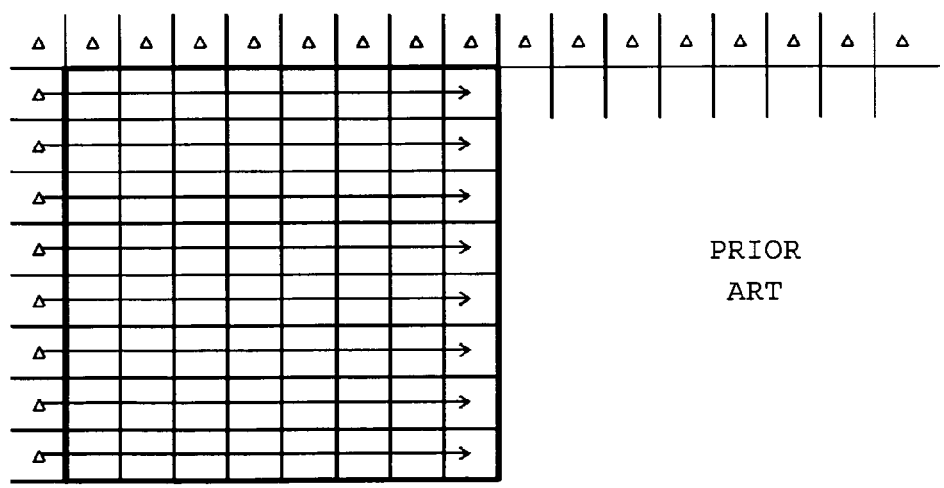
FIG. 8b depicts an example of the horizontal mode in which pixel values for a current block are predicted by using pixel values of the neighboring block in the horizontal direction.
Figure 8C:
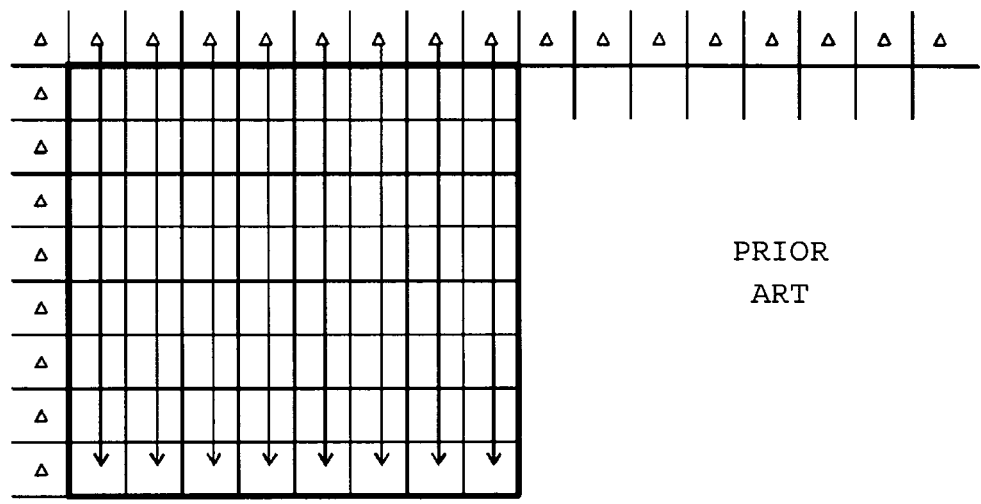
FIG. 8c depicts an example of the vertical mode in which pixel values for a current block are predicted by using pixel values of the neighboring block in the vertical direction.
Figure 8D:
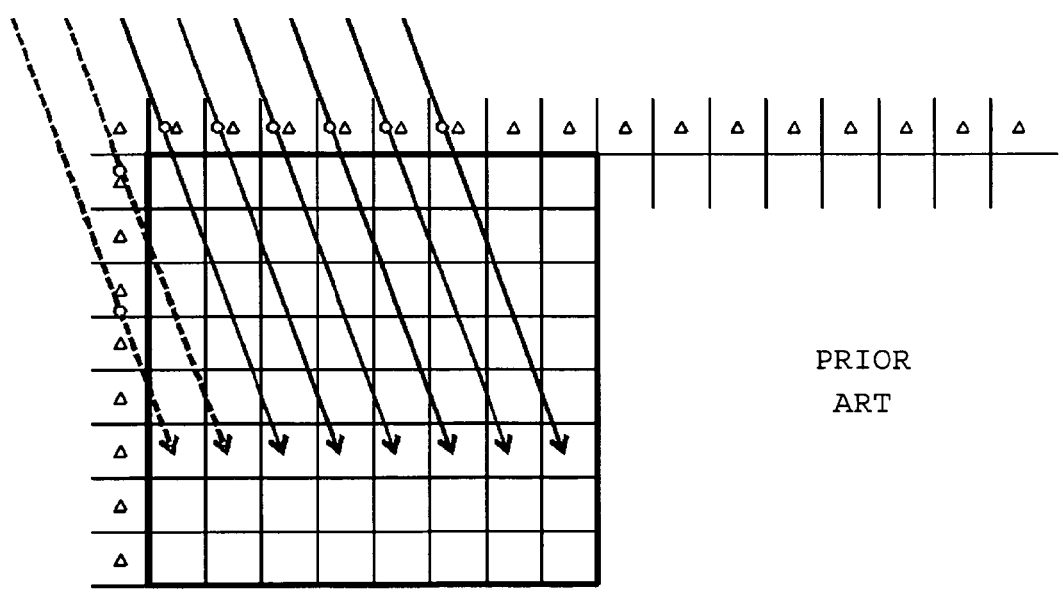
FIG. 8d depicts an example of predicting one row of pixels in a block from reference pixels, when the displacement between the lowest row of the block and the reference row is negative.
Figure 9A:
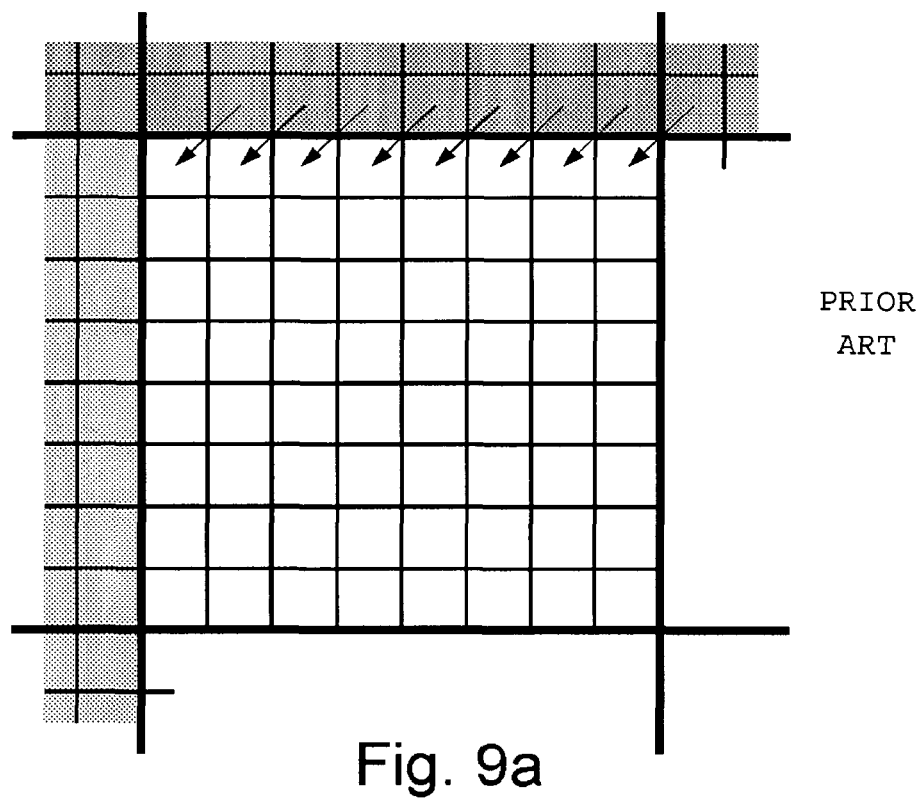
FIG. 9a illustrates an example of prediction of pixels of the top row of an image block to be encoded.
Figure 9B:
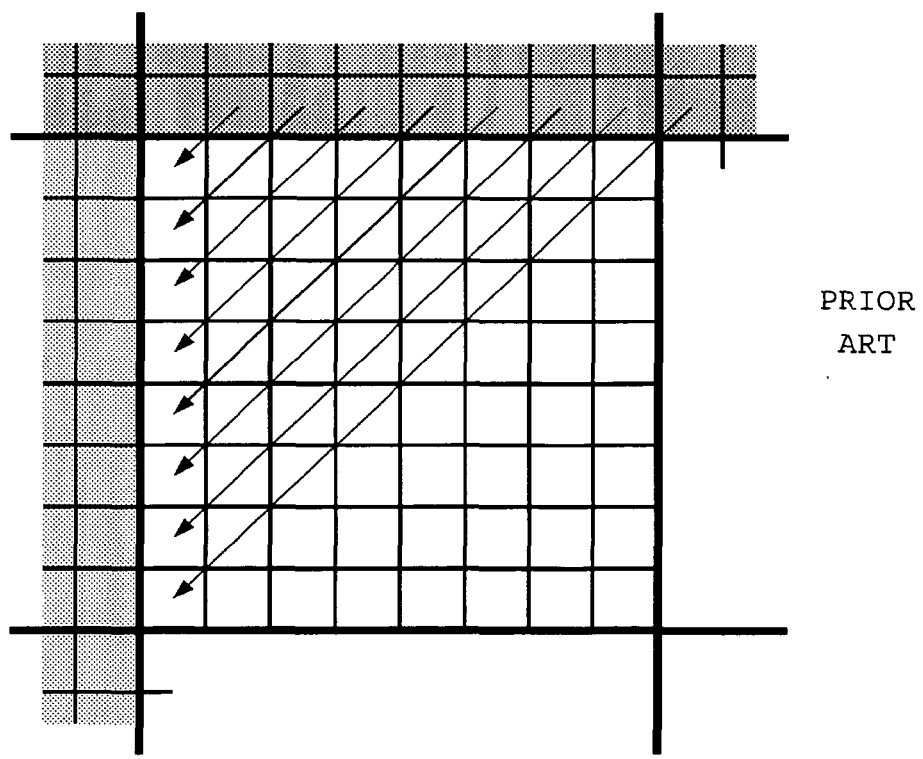
FIG. 9b illustrates an example of prediction of pixels of the left-most column of an image block to be encoded.
Figure 9C:
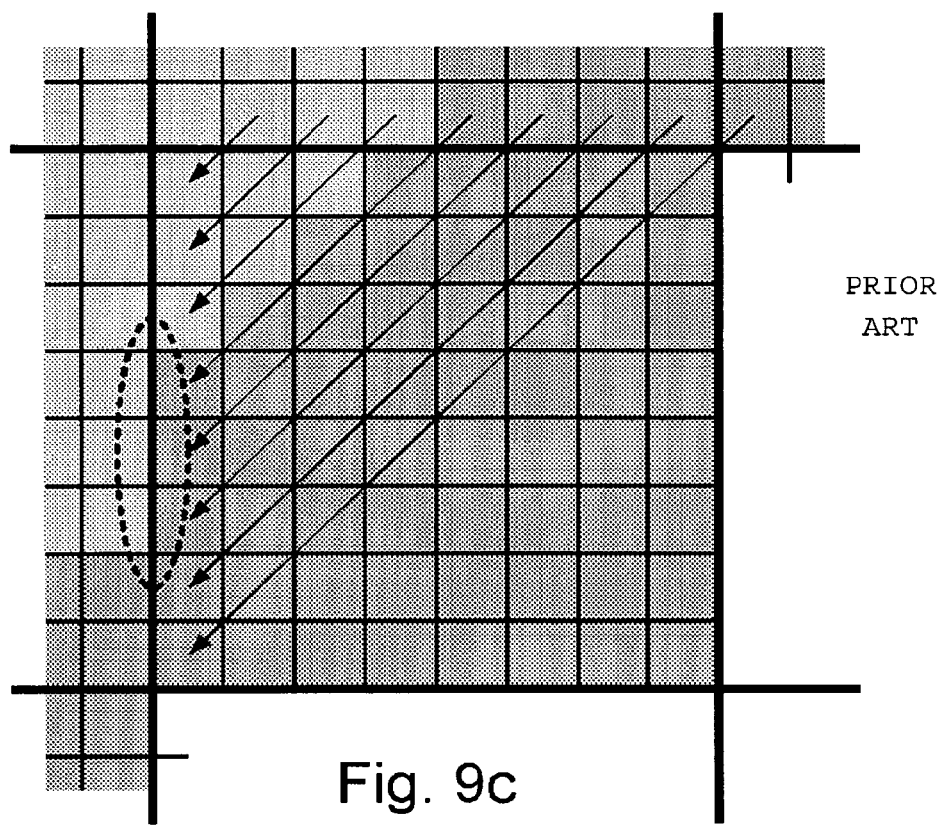
FIG. 9c illustrates an example of a potential discontinuity along one of the borders of an image block to be encoded after directional intra prediction has been applied.

In the example of FIG. 8a the displacements are expressed as angles thus the term angularity can also be used to express the directionality of the intra-prediction. In this example the angularity can be between −32/32 to +32/32 i.e. −1, . . . , +1 in both the horizontal and vertical direction and includes certain values within this range. These values are [−32, −26, −21, −17, −13, −9, −5, −2, 0, 2, 5, 9, 13, 17, 21, 26, 32]/32 but also other sets of angularity values can be used. These values indicate the offset between the current pixel and the pixel from which the prediction is generated or a fraction of a pixel. For example, if the angularity has the value −32/32 that would mean an angle of −45 degrees with respect to the horizontal or vertical direction. Correspondingly, 0/32 means either a horizontal or vertical direction (0 degrees in the horizontal or vertical direction) and 32/32 would mean an angle of +45 degrees with respect to the horizontal or vertical direction.

If the reference pixel for a pixel to be predicted were between two pixels of the neighboring block, the reference pixel value could be calculated by e.g. interpolating the values of these two pixels.

In some embodiments the block processor 381 or another element of the encoder may determine to use only a subset of available intra prediction modes when the block processor 381 performs the prediction for the current block. In some embodiments there are nine different prediction modes from which one prediction mode can be selected. The prediction modes indicate the prediction directions on the basis of which the block processor 381 may determine which pixel values of a neighboring block of the current block to use in prediction of pixel values of the current block. In an example embodiment, for a block size of 4×4 samples, Mode 0 corresponds with a vertical prediction direction, Mode 1 corresponds with a horizontal prediction direction, Modes 3 to Mode 8 correspond with different diagonal directions, and Mode 2 corresponds with a prediction based on values of adjacent samples (DC prediction).

For example, if there were nine prediction modes Mode 0, Mode 1, . . . , Mode 8 from which one prediction mode could be selected, the block processor 381 may only use e.g. every other mode (for examples Mode 1, Mode 3, . . . , Mode 7 or Mode 0, Mode 2, . . . , Mode 8) and select the prediction mode for the current block among the modes of that subset. However, in some other embodiments the subset of the modes could also be different from the above. The encoder may provide an indication of the subset of the selectable modes to the decoder so that the decoder is aware of the modes from which the selection has been made. In addition to the indication of the subset, the encoder may provide an indication of the selected mode to the decoder. In some example embodiments the indication of the subset of the available modes is provided in a sequence parameter set. However, the indication of the subset need not be provided in the same bitstream than the prediction information but it can also be provided by using another bitstream or other means of communication.

When the cost has been calculated with respect to each or to a selected set of intra prediction modes and possibly with respect to the inter prediction mode, the block processor 381 selects one intra prediction mode or the inter prediction mode for encoding the current block. If an intra prediction mode was selected, the selected intra prediction mode includes the directionality indication which may also be indicated to a decoder.

When the block processor 381 has selected to use an intra prediction mode, and selected, when necessary, the appropriate number of prediction modes to be used in the prediction of the current block, the block processor 381 determines which prediction mode to use in the prediction. The selected prediction mode may then be signaled to the decoder.

The block processor 381 may select the mode to be used before the intra-prediction filtering or after the intra-prediction filtering. If the selection is made before the intra-prediction filtering the intra-prediction filter 385 may only produce filtered pixel values for the selected mode (direction, angularity). If the selection is made after the intra-prediction filtering the intra-prediction filter 385 may produce filtered pixel values for each available mode (direction, angularity) or for a subset of them.

In some embodiments of the invention, either the leftmost column of predicted samples, or the top row of predicted samples is filtered depending on the angularity of the directional intra prediction. The leftmost column is filtered in the case of vertical predictions and the top row in the case of horizontal predictions. FIG. 8a shows available intra prediction directions in this example implementation (angles of [−32, −26, −21, −17, −13, −9, −5, −2, 0, 2, 5, 9, 13, 17, 21, 26, 32]/32 from both vertical and horizontal direction as already discussed above). The input samples and filter coefficients for the filtering process may be selected based on the directionality of the applied intra prediction mode.

In the following the operation of the intra-prediction filtering will be described in more detail with reference to the block diagram of FIG. 4b and the FIGS. 9a-9c and 10a-10b. The intra-prediction filter 385 receives information of the angularity i.e. the direction of the intra-prediction filtering and uses that information to determine how to adapt the filtering which will be performed on the selected pixels. In other words, the angularity may affect to the coefficients of the filtering algorithms, the selection of filtering algorithms, etc. In the following the equations 2a and 2b will be used as an example of the intra-prediction filtering. The coefficient selector 388 may, for example, compare the angularity information with one or more threshold values. For example, a first threshold value may be −9 and a second threshold value may be 9 as is illustrated in Table 1. Then, if the angularity in the prediction direction is smaller than the first threshold value (e.g. −9), the filter tap coefficient Td is set to the value 2 and the filter offset Fd is set to the value −1. If the angularity is not smaller than the first threshold value and not larger than a second threshold value, the filter tap coefficient Td is set to the value 1 and the filter offset Fd is set to the value 0. If the angularity is larger than the second threshold value, the filter tap coefficient Td is set to the value 2 and the filter offset Fd is set to the value 1.

TABLE 1

Derivation of filter tap (Td) and filter offset (Fd) coefficients based on angularity d of the directional intra prediction mode

| Angularity (d) | Filter tap (Td) | Filter offset (Fd) |
|---|---|---|
| Smaller than −9 | 2 | −1 |
| From −9 to 9 | 1 | 0 |
| Larger than 9 | 2 | 1 |

In some embodiments the coefficient values are set to the filtering element 388 and the intra-prediction filtering may be performed as follows:

$$P(0, y) = ((8-Td) \cdot p(0, y) + Td \cdot p(-1, y+Fd) + 4) >> 3, \quad (2a)$$

in which y=0, . . . , N−1 for vertical prediction modes $$P(x, 0) = ((8-Td) \cdot p(x, 0) + Td \cdot p(x+Fd, -1) + 4) >> 3, \quad (2b)$$

in which x=0, . . . , M−1 for horizontal prediction modes

In the equations 2a and 2b the variable P denotes the output samples of the filtering process and the variable p denotes the input samples to the filtering process. In this case p includes both reconstructed samples of the neighboring blocks, when either the first or the second index to p is negative, and samples predicted using the selected directional intra prediction process (mode), when both indexes to p are non-negative. In the equations above the filter taps (8−Td) and Td and filter offset Fd are obtained using the mapping in Table 1. x and y denote the pixel coordinates of the samples having their origin at the top-left corner of the block to be processed. N denotes the height of the block and M denotes the width of the block in pixels.

The filter offset Fd may depend on the angularity of the intra prediction direction and need not have to be an integer value. For example, the filter offset Fd can be the exact inverse of the intra prediction direction.

Figure 10A:
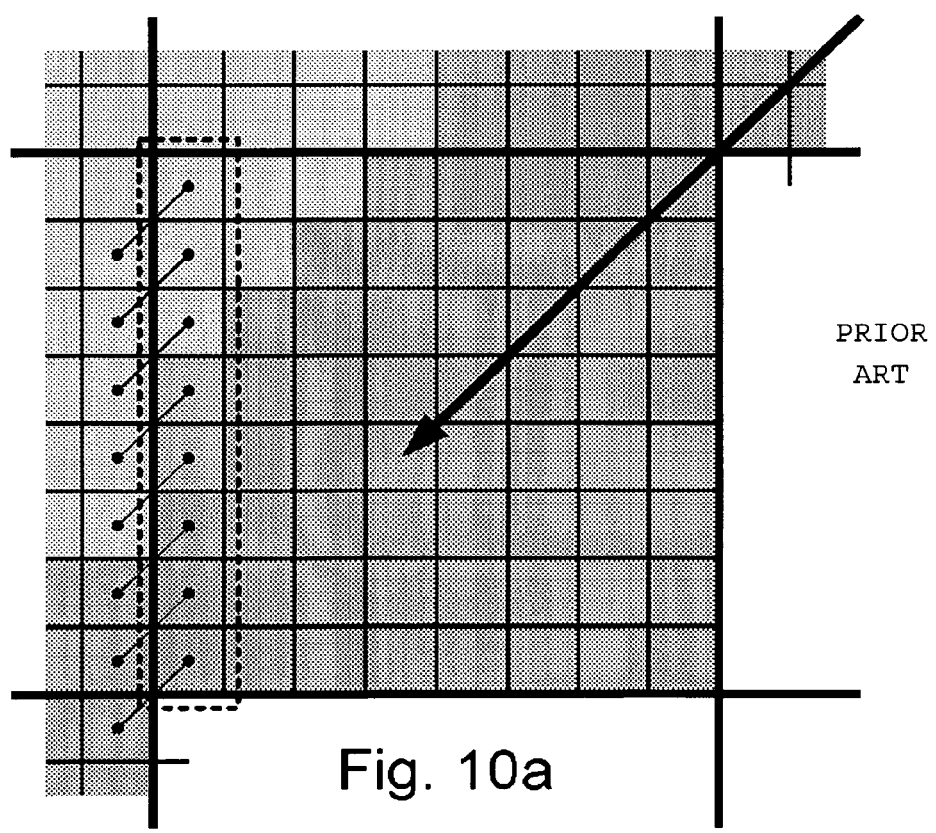
FIGS. 10a-10d illustrate examples of the filtering process for a specific data set.
Figure 10C:
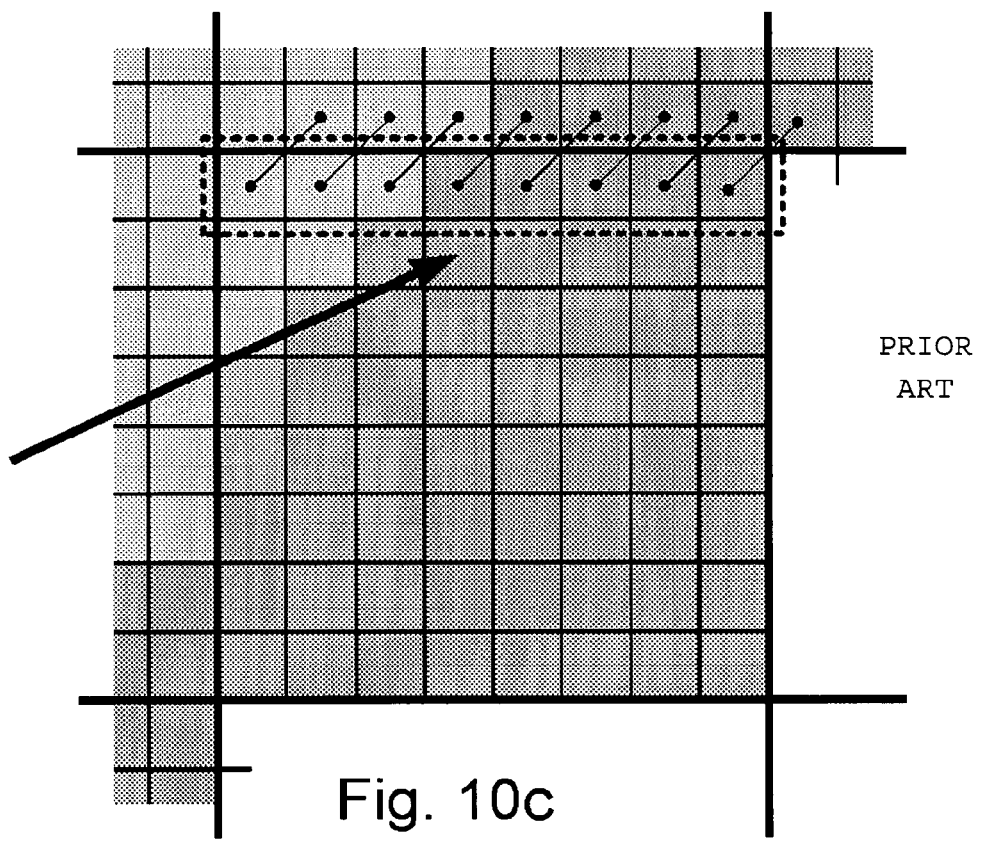
Figure 10D:
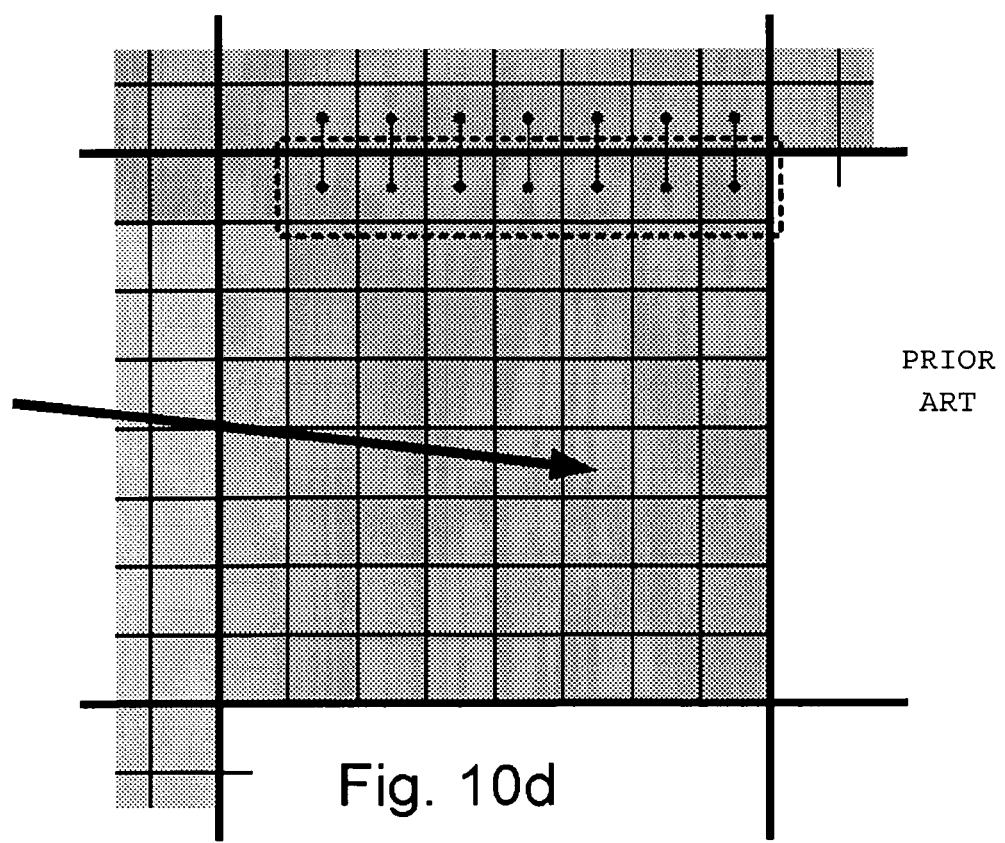
Figure 10B:
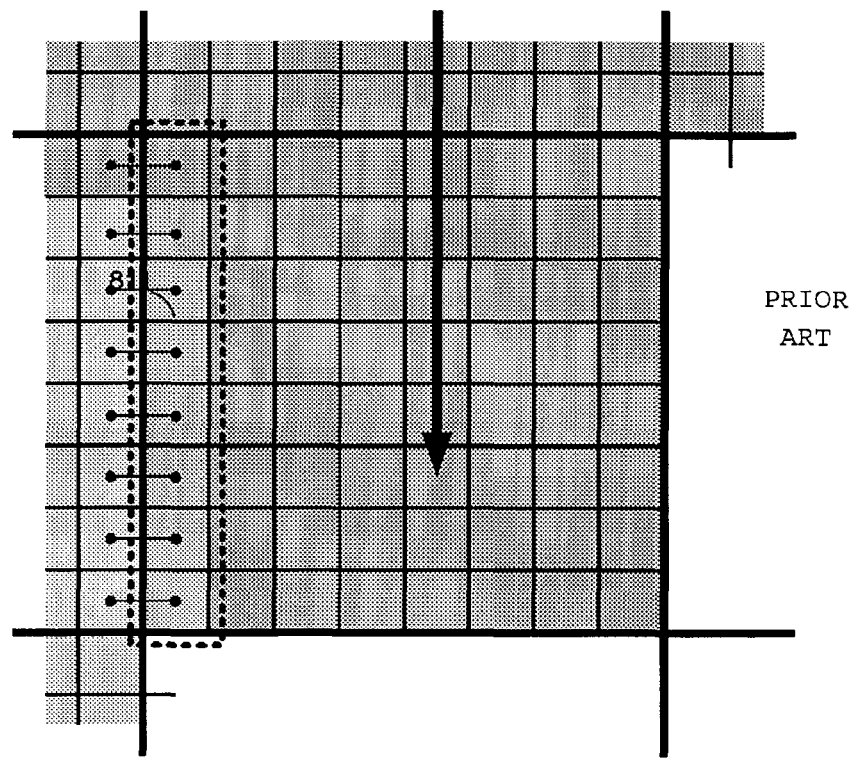

To further illustrate the filtering operation we shall now refer to FIGS. 10a, 10b, 10c and 10d and use Table 1 and equations 2a and 2b. FIGS. 10a and 10b illustrate the filtering process by showing examples of filter operation for a specific data set when vertical prediction has been applied and FIGS. 10c and 10d illustrate the filtering process by showing examples of filter operation for a specific data set when horizontal prediction has been applied. In these figures the arrow shows the angularity of the directional intra prediction, dashed box indicates the location of the filtered pixels and lines with ball ends indicate input pixels to each filtering operation.

In FIG. 10a the prediction direction is +45 degrees and the vertical prediction have been used i.e. the equation 2a will be used in the filtering. In this case the filtering is performed for the pixels of the left-most column of the current block. The prediction direction is larger than the second threshold. Thus, the equation 2a becomes $$P(0, y) = (6 \cdot p(0, y) + 2 \cdot p(-1, y+1) + 4) >> 3,$$

If we calculate the filtered pixel values for the pixels of the left-most column of the block in FIG. 10a, the filtered pixel values are $P(0,0)=6 \cdot p(0, 0)+2 \cdot p(-1, 1)+4) >> 3$, $P(0,1)= 6 \cdot p(0, 1)+2 \cdot p(-1, 2)+4) >> 3, \ldots, P(0,7)=6 \cdot p(0, 7)+2 \cdot p(-1, 8)+4) >> 3$.

In this example it may not be necessary to filter the pixels of the top-most row of the current block because the pixels of the neighboring block which are used in the prediction may be close to the corresponding pixel values of the top row of the current block. Hence, the filtering may not necessarily improve the prediction. On the other hand, the intra-prediction filter 385 may perform the filtering and compare the filtered prediction results with non-filtered prediction results and determine whether the filtering improves the prediction or not.

In FIG. 10b the prediction direction is 0 degrees and the vertical prediction have been used i.e. the equation 2a will be used. The prediction direction is in between the first threshold and the second threshold. Thus, the equation 2a becomes $$P(0, y) = (7 \cdot p(0, y) + 1 \cdot p(-1, y) + 4) >> 3,$$

If we calculate the filtered pixel values for the pixels of the left-most column of the block in FIG. 10a, the filtered pixel values are $P(0,0)=7 \cdot p(0, 0)+1 \cdot p(-1, 0)+4) >> 3$, $P(0,1)= 7 \cdot p(0, 1)+1 \cdot p(-1, 1)+4) >> 3, \ldots, P(0,7)=7 \cdot p(0, 7)+1 \cdot p(-1, 7)+4) >> 3$.

It should be noted here that there are many other possibilities to implement the filtering process. For example, a kind of a generalization of the above equations can be expressed as follows:

$$P(0,y)=(W1 \cdot p(0, y)+W2 \cdot p(-1*distance, y+Fd)+ \text{rounding\_offset}) >> 2^{A-1}, \quad (3a)$$

in which y=0, ..., N−1 for vertical prediction modes and the rounding_offset=A+1

$$P(x,0)=(W1 \cdot p(x,0)+W2 \cdot p(x+Fd,-1*distance)+ \text{rounding\_offset}) >> 2^{A-1}, \quad (3b)$$

in which x=0, ..., M−1 for horizontal prediction modes and the rounding_offset=A+1

The coefficients W1 and W2 are the first weighting factor and the second weighting factor, respectively. In some embodiments $W1=(2^A-W2)$ and $W2=Td$. Hence, $W1+W2=2^A$.

For example, the coefficient A may have a value 4, the value of the first filter tap is 16−Td, the value of the second filter tap is Td and the rounding_offset is 8. The distance indicates how far the pixels to be used in the filtering are from the border between the current block and the neighboring block. In some embodiments the distance is −1 thus the pixels of the row or column which is closest to the border of the neighboring block are used in the calculation. This corresponds with the situation illustrated in FIGS. 10a and 10b. If the distance is −2 pixels of the two rows/columns beside the border could be used in the filtering.

The notation >>A means that the result is bit-wise shifted to the right. This corresponds a division by $2^A$.

The weighting factor $2^A$ need not be a power of two but it may simplify the calculations of the filtered pixel values.

In FIG. 10c the prediction direction is about 30 degrees and horizontal prediction has been used. In this example the pixels of the top row of the current block are filtered. In the example of FIG. 10d the prediction direction is about −7 degrees and horizontal prediction has been used. In this example some pixels of the top row of the current block are filtered. However, the pixel closest to the neighboring block on the right hand side of the current block is not filtered by the intra-prediction filtering because in this illustrative example it is assumed that the filtering of this particular pixel would not improve the prediction.

In some other embodiments the filter may be a more-than-two tap filter, such as a 3-tap or a 4-tap filter. Then, more than one pixel of the neighboring block can be used in the filtering. In some embodiments the filtering of a pixel of the current block may also use more than one other pixel of the current block. The pixel values of the other pixels of the current block may be predicted but not filtered pixel values, or predicted and filtered pixel values, or both.

It is also possible to pre-process some or all the input samples to the filter before the filtering operation. For example, the pixel values may be quantized, multiplied or modified by another way. In some embodiments some or all the input samples to the filter can be interpolated samples, for example output samples from a sub-pixel interpolation process.

In the examples presented above all pixels of one row or column were filtered but the invention can also be implemented so that not all samples in one row or column are filtered. For example, pixels of the current block which are close to the pixel values which are used in the prediction of the pixel values of the current block can be omitted from the filtering process. In the examples of FIGS. 10a and 10b the pixels which are near the block border in the direction of the intra-prediction (i.e. in the backwards direction of the arrow) may be omitted from filtering in some embodiments. Such pixel(s) is/are the uppermost pixel(s) of the current block in FIGS. 10a and 10b.

It is also possible to select the set of samples (pixels) for filtering and the filter coefficients adaptively based on different criteria (e.g. analyzing the predicted pixel values and the reference pixel values used in the directional intra prediction process).

The indication of a directional intra prediction mode may comprise an angle indicated, for example, as a displacement of one row of the current block with respect to a reference row of pixels of a neighboring block in case of vertical prediction or as a displacement of one column of the current block with respect to a reference column of pixels of a neighboring block in case of horizontal prediction. In some embodiments the allowed displacements in the horizontal and vertical direction may depend on the size of the block to be encoded. Some example ranges are from –N to +N pixels for a block size of N×N pixels for both horizontal and vertical prediction. Other example ranges are –2N×+2N pixels, –3N×+3N pixels, –2N×+4N pixels, –4N×+2N pixels, etc. The angle may also be indicated by using other means, for example as an integer value, a floating point number, etc.

The same or different intra prediction direction can be applied for different components of the picture block (such as luminance, chrominance or depth component), or the indication of the intra prediction direction for one or more components can be used to limit the allowed set of intra prediction directions of one or more other components. Also the intra-prediction filtering can be applied differently to different color planes (e.g. luminance and chrominance) or can be switched on or off for specific color planes or auxiliary video pictures such as depth pictures in a 3D video sequence.

The intra-prediction filtering may also be different for different prediction block sizes. For example, the intra-prediction filtering may be performed to certain block sizes but is not performed to certain other block sizes. Also the filtering process can be different depending on the prediction block sizes and/or other contextual data and/or another property. It is also possible to implement different filtering processes based on the directionality of the intra-prediction.

In some embodiments the selection of pixels to undergo the filtering may depend on some features of the prediction process. For example, the number of rows to be filtered may be different from the number of columns to be filtered, or the number of rows or columns to be filtered may not be the same for each predicted block.

The predicted pixel values or predicted pixel values quantized by the optional quantizer 384 are provided as the output of the mode selector.

The output of the mode selector is passed to a first summing device 321. The first summing device may subtract the pixel predictor 302 output from the image 300 to produce a first prediction error signal 320 which is input to the prediction error encoder 303.

The pixel predictor 302 further receives from a preliminary reconstructor 339 the combination of the prediction representation of the image block 312 and the output 338 of the prediction error decoder 304. The preliminary reconstructed image 314 may be passed to the intra-predictor 308 and to a filter 316. The filter 316 receiving the preliminary representation may filter the preliminary representation and output a final reconstructed image 340 which may be saved in a reference frame memory 318. The reference frame memory 318 may be connected to the inter-predictor 306 to be used as the reference image against which the future image 300 is compared in inter-prediction operations.

The operation of the pixel predictor 302 may be configured to carry out any known pixel prediction algorithm known in the art.

The operation of the prediction error encoder 302 and prediction error decoder 304 will be described hereafter in further detail. In the following examples the encoder generates images in terms of 16×16 pixel macroblocks which go to form the full image or picture. Thus, for the following examples the pixel predictor 302 outputs a series of predicted macroblocks of size 16×16 pixels and the first summing device 321 outputs a series of 16×16 pixel residual data macroblocks which may represent the difference between a first macro-block in the image 300 against a predicted macro-block (output of pixel predictor 302). It would be appreciated that other size macro blocks may be used.

The prediction error encoder 303 comprises a transform block 342 and a quantizer 344. The transform block 342 transforms the first prediction error signal 320 to a transform domain. The transform is, for example, the DCT transform. The quantizer 344 quantizes the transform domain signal, e.g. the DCT coefficients, to form quantized coefficients.

The entropy encoder 330 receives the output of the prediction error encoder and may perform a suitable entropy encoding/variable length encoding on the signal to provide error detection and correction capability. Any suitable entropy encoding algorithm may be employed.

The prediction error decoder 304 receives the output from the prediction error encoder 303 and performs the opposite processes of the prediction error encoder 303 to produce a decoded prediction error signal 338 which when combined with the prediction representation of the image block 312 at the second summing device 339 produces the preliminary reconstructed image 314. The prediction error decoder may be considered to comprise a dequantizer 346, which dequantizes the quantized coefficient values, e.g. DCT coefficients, to reconstruct the transform signal and an inverse transformation block 348, which performs the inverse transformation to the reconstructed transform signal wherein the output of the inverse transformation block 348 contains reconstructed block(s). The prediction error decoder may also comprise a macroblock filter (not shown) which may filter the reconstructed macroblock according to further decoded information and filter coefficients.

The mode selector 310 provides an indication of the encoding mode of the current block. The indication may be encoded and inserted to a bit stream or stored into a memory together with the image information. In connection with the intra prediction modes it may be necessary to include some indication of the selected intra prediction mode to the bit stream. For example, the indication may include information on the directionality of the intra prediction mode. In some example embodiments the information on the directionality is indicated as a displacement value. In some embodiments the displacement value indicates which reference value is used to obtain the prediction value of the last pixel of the last row of the current block. In some other embodiments the angular coefficient of the directionality is included in the bit stream. In yet another embodiments the allowed directionality values (intra prediction modes) are indexed and the index of the selected intra prediction mode is included in the bit stream.

In some embodiments the encoder may provide an indication that the intra-prediction filtering is used. The indication may indicate that the intra-prediction is in use. The indication may also indicate which kind of filter and/or filtering coefficients should be used by the decoder when decoding the video stream. In addition or alternatively, the indication may indicate one or more thresholds which the decoder can use to select the filter and/or filtering coefficients.

The indication of the encoding mode and/or the indication regarding the intra prediction filtering may not be included in the bit stream as such but they may also be encoded e.g. by entropy encoding. The prediction direction can also be entropy coded in a predictive manner considering used prediction directions in the image block's neighborhood, statistics of earlier prediction directions or other variables.

If the intra-prediction mode is selected, the block is predicted by an intra-prediction method. Respectively, if the inter-prediction mode is selected, the block is predicted by an inter-prediction method.

In the intra-prediction method the block processor 381 optionally selects a subset of available prediction modes. The block processor 381 may also select 505 one prediction mode among the prediction modes included in the (selected) subset. The block processor 381 may also determine a codeword to indicate the selected prediction mode by using an alphabet of codeword which corresponds with the selected subset of prediction modes. The codeword may be included in the bitstream (507). Also an indication of the selected subset may be included in the bitstream, if necessary.

Figure 11:
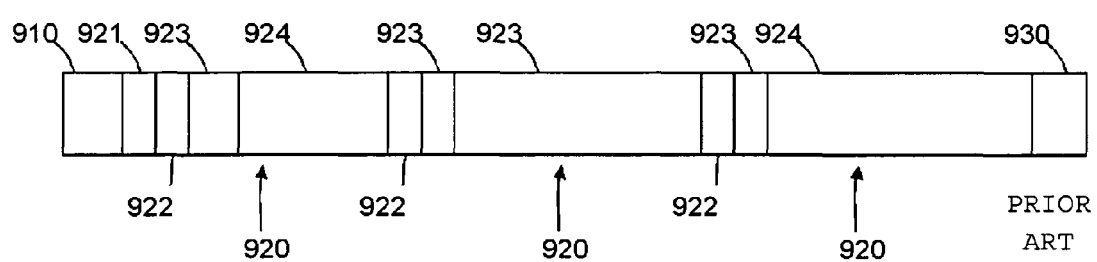
FIG. 11 depicts an example of a bit stream of an image.

FIG. 4b depicts the intra-prediction filter 385 of an example embodiment of the encoder in more detail. The intra-prediction filter 385 may be implemented in a prediction processor 309 or as another circuitry. The prediction processor 309 may be a separate processor or it may be the same processor than the block processor 381. The intra-prediction filter 385 comprises the first input 386 to input information on the angularity and the second input 387 for receiving pixels to be filtered. The coefficient selector 388 uses the angularity information to adapt the filtering of the filtering element 389. For example, the coefficient selector 388 may select a filter among a set of available filters 402, and select one or more coefficients 401 for the filter. The coefficients may include values for the taps of the filter and a filter offset. The filter or filters may be N-tap filters or other appropriate filters. In an example embodiment, as is depicted in FIG. 11, the bit stream of an image comprises an indication of the beginning of an image 910, image information of each block of the image 920, and indication of the end of the image 930. The bit stream may comprise the indication 921 of the intra-prediction filtering. The indication may indicate whether the filtering is utilized or not for a specific block, a set of blocks, a specific picture, a set of pictures or a complete video sequence. The indication may be transmitted for each intra-predicted block, if the intra-prediction filtering can be switched on or off on a block-by-block basis. On the other hand, if the intra-prediction filtering can be switched on or off on a image-by-image basis, then it may be sufficient to transmit the indication once for each image. In situations in which the intra-prediction filtering is always applied for intra-predicted blocks, the indication need not be transmitted and the decoder can be set to operate so that it applies the intra-prediction filtering for each intra-predicted block.

The image information of each block of the image 920 may include the indication of the prediction mode 922, indication of the directionality 923, and the indication of pixel values of the block 924 which may actually include coefficients of the residual signal when the inter- or intra-prediction has been used for the image block. It is obvious that the bit stream may also comprise other information. Further, this is only a simplified image of the bit stream and in practical implementations the contents of the bit stream may be different from what is depicted in FIG. 9.

The bit stream may further be encoded by the entropy encoder 330.

Although the embodiments above have been described with respect to the size of the macroblock being 8×8 pixels, it would be appreciated that the methods and apparatus described may be configured to handle macroblocks of different pixel sizes, for example 16×16, 32×32, 64×64, etc.

Figure 6:
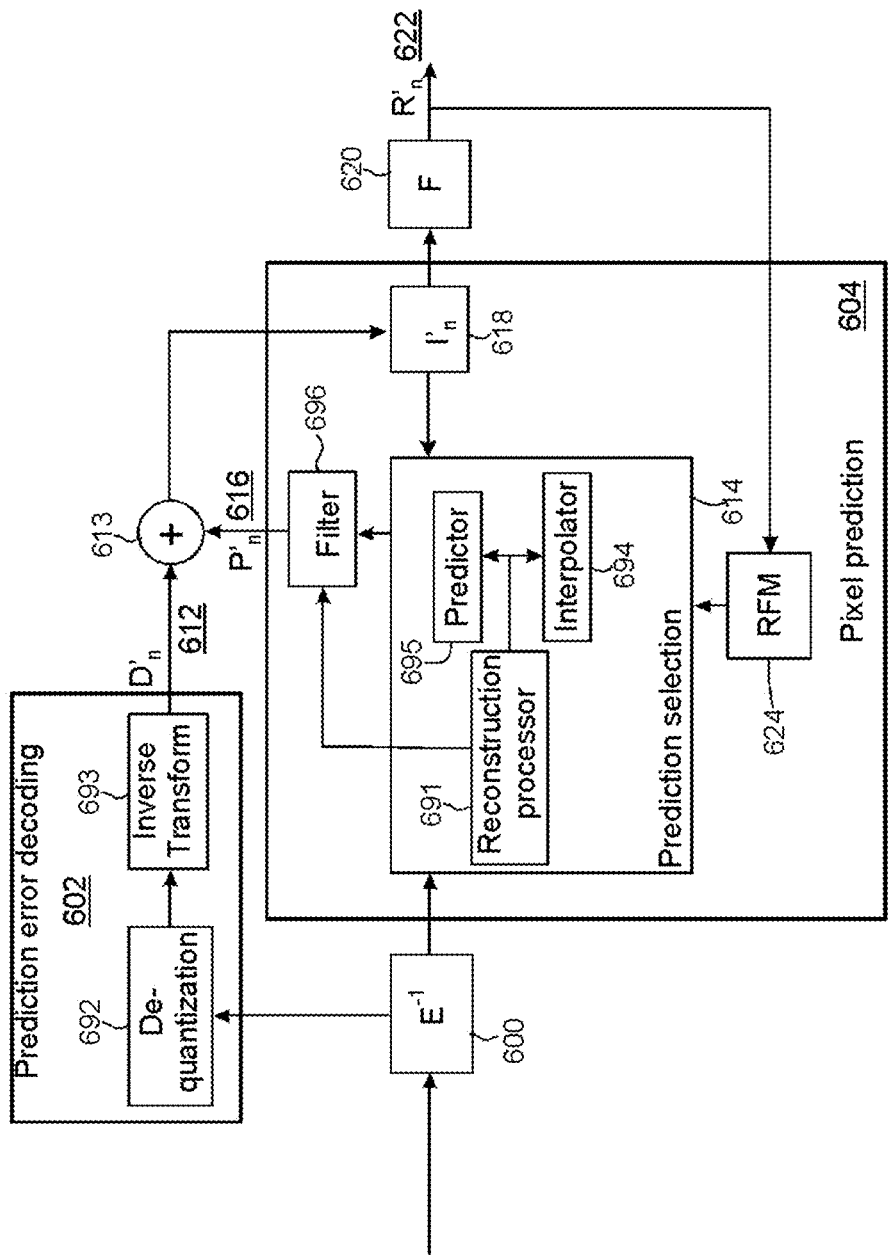
FIG. 6 shows a schematic diagram of a decoder according to some embodiments of the invention.

In the following the operation of an example embodiment of the decoder 600 is depicted in more detail with reference to FIG. 6.

For completeness a suitable decoder is hereafter described. At the decoder side similar operations are performed to reconstruct the image blocks. FIG. 6 shows a block diagram of a video decoder suitable for employing embodiments of the invention. The decoder shows an entropy decoder 600 which performs an entropy decoding on the received signal. The entropy decoder thus performs the inverse operation to the entropy encoder 330 of the encoder described above. The entropy decoder 600 outputs the results of the entropy decoding to a prediction error decoder 602 and pixel predictor 604.

Figure 7:
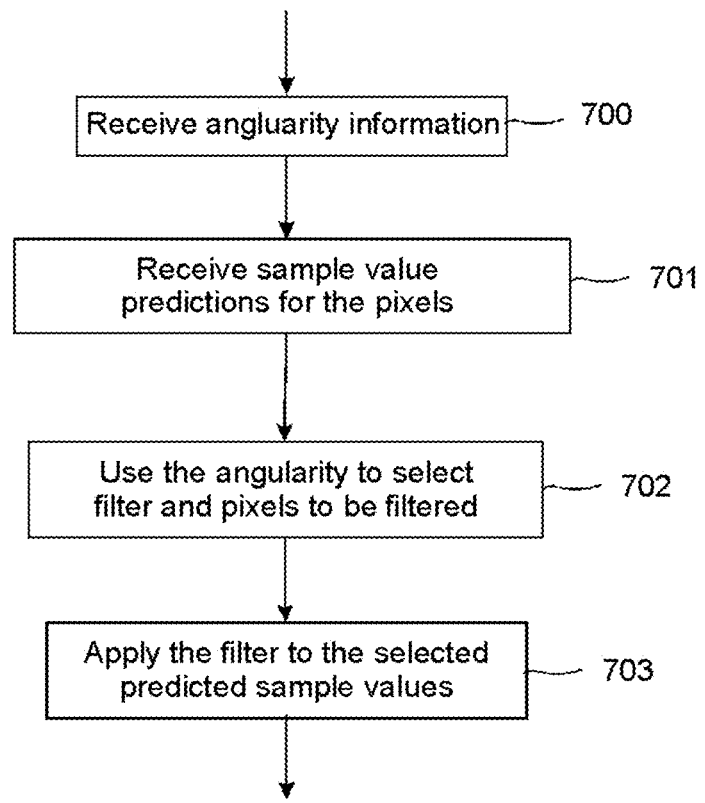
FIG. 7 shows a flow diagram of showing the operation of an embodiment of the invention with respect to the decoder shown in FIG. 6.

The pixel predictor 604 receives the output of the entropy decoder 600. The output of the entropy decoder 600 may include an indication on the prediction mode used in encoding the current block. A predictor selector 614 within the pixel predictor 604 determines that an intra-prediction, an inter-prediction, or interpolation operation is to be carried out. In the case of intra-prediction, the prediction selector 614 may inform the intra-prediction filter 696 of the angularity of the prediction performed for the current block (block 700 in FIG. 7). The predictor selector may furthermore output a predicted representation of an image block 616 to the intra-prediction filter 696 (block 701). The intra-prediction filter 696 of the decoder may perform similar operations than the intra-prediction filter 696 of the encoder. The operation may include using the angularity information to select pixels to be filtered, the filter and filter coefficients on the basis of the angularity (block 702). The intra-prediction filter 696 may then perform the filtering for the selected pixels (block 703). The predicted and possibly intra-prediction filtered representation of the image block may then be provided to a first combiner 613. The predicted representation of the image block 616 is used in conjunction with the reconstructed prediction error signal 612 to generate a preliminary reconstructed image 618. The preliminary reconstructed image 618 may be used in the predictor 614 or may be passed to another filter 620. The filter 620 applies a filtering which outputs a final reconstructed signal 622. The final reconstructed signal 622 may be stored in a reference frame memory 624, the reference frame memory 624 further being connected to the predictor 614 for prediction operations.

In the case of intra-prediction the pixel predictor 604 may also receive indication on the subset of the intra prediction modes which the encoder has used when selecting the intra prediction mode. This indication may be have been previously received from the encoder, wherein a parameter in the decoder indicative of the subset may have been set to a corresponding value so that the pixel predictor 604 may use the value of the parameter in determining the correct subset. In some other embodiments the indication on the subset of the intra prediction mode may be received in the bitstream during the reception of the bitstream containing encoded video information.

The prediction error decoder 602 receives the output of the entropy decoder 600. A dequantizer 692 of the prediction error decoder 602 may dequantize the output of the entropy decoder 600 and the inverse transform block 693 may perform an inverse transform operation to the dequantized signal output by the dequantizer 692. The output of the entropy decoder 600 may also indicate that prediction error signal is not to be applied and in this case the prediction error decoder produces an all zero output signal.

In some embodiments the decoder 600 may determine the intra-prediction angularity by examining the pixel values of the neighboring blocks, for example. Hence, the decoder 600 need not be informed by the encoder of the angularity.

In the above examples the invention was described in such a manner that there is only one angularity for each block to be encoded/decoded. However, there may be situations in which more than one prediction direction is used when encoding and/or decoding a block of pixels. Hence, the encoder may indicate in the bitstream or by other means that there are multiple prediction directions wherein the decoder may receive a multiple of angularity information for one block.

The bitstream may include an indication whether the filtering is utilized or not for a specific block, a set of blocks, a specific picture, a set of pictures or a complete video sequence.

Figure 12:
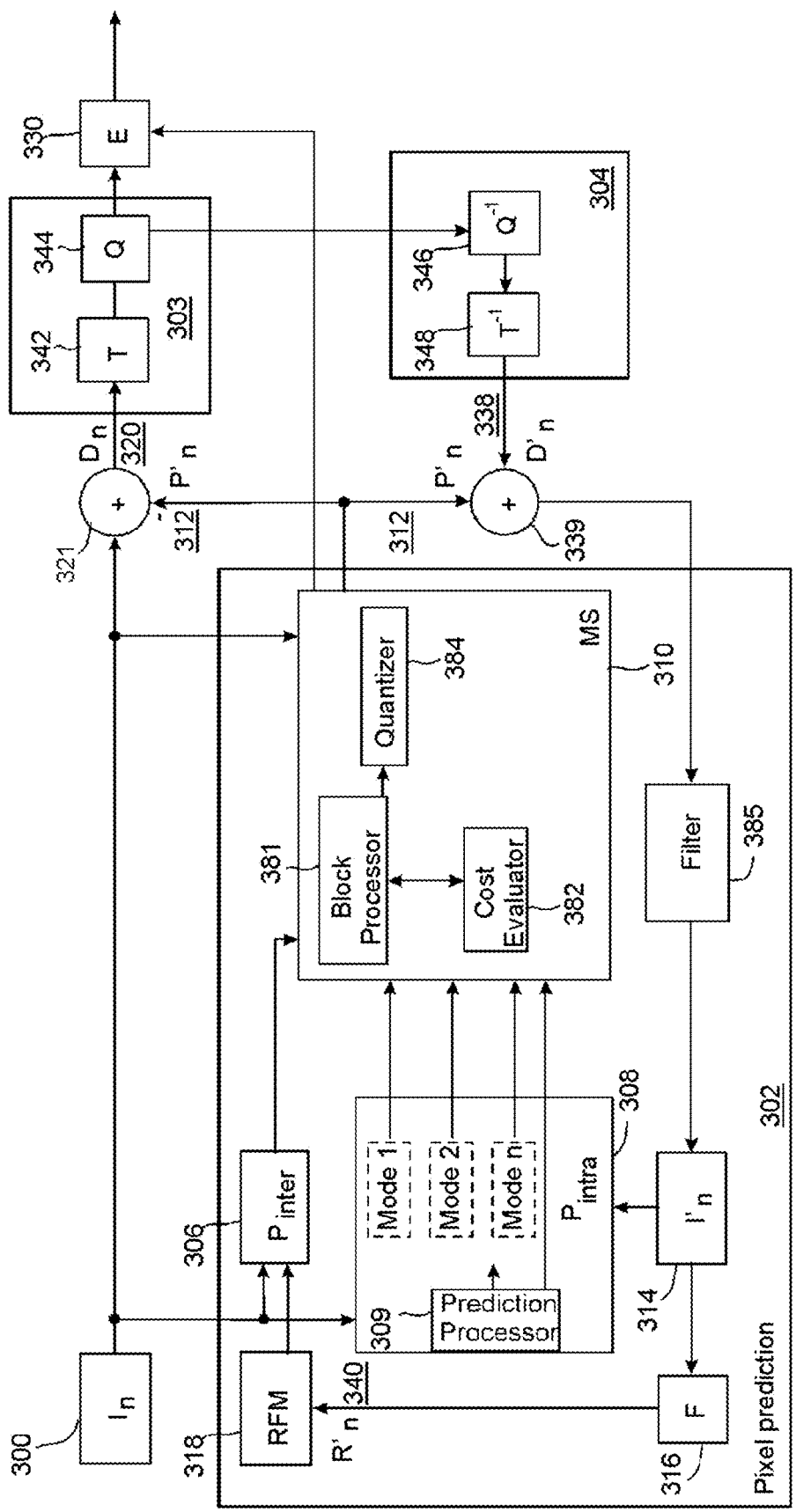
FIG. 12 shows schematically another embodiment of the invention as incorporated within an encoder.
Figure 13:
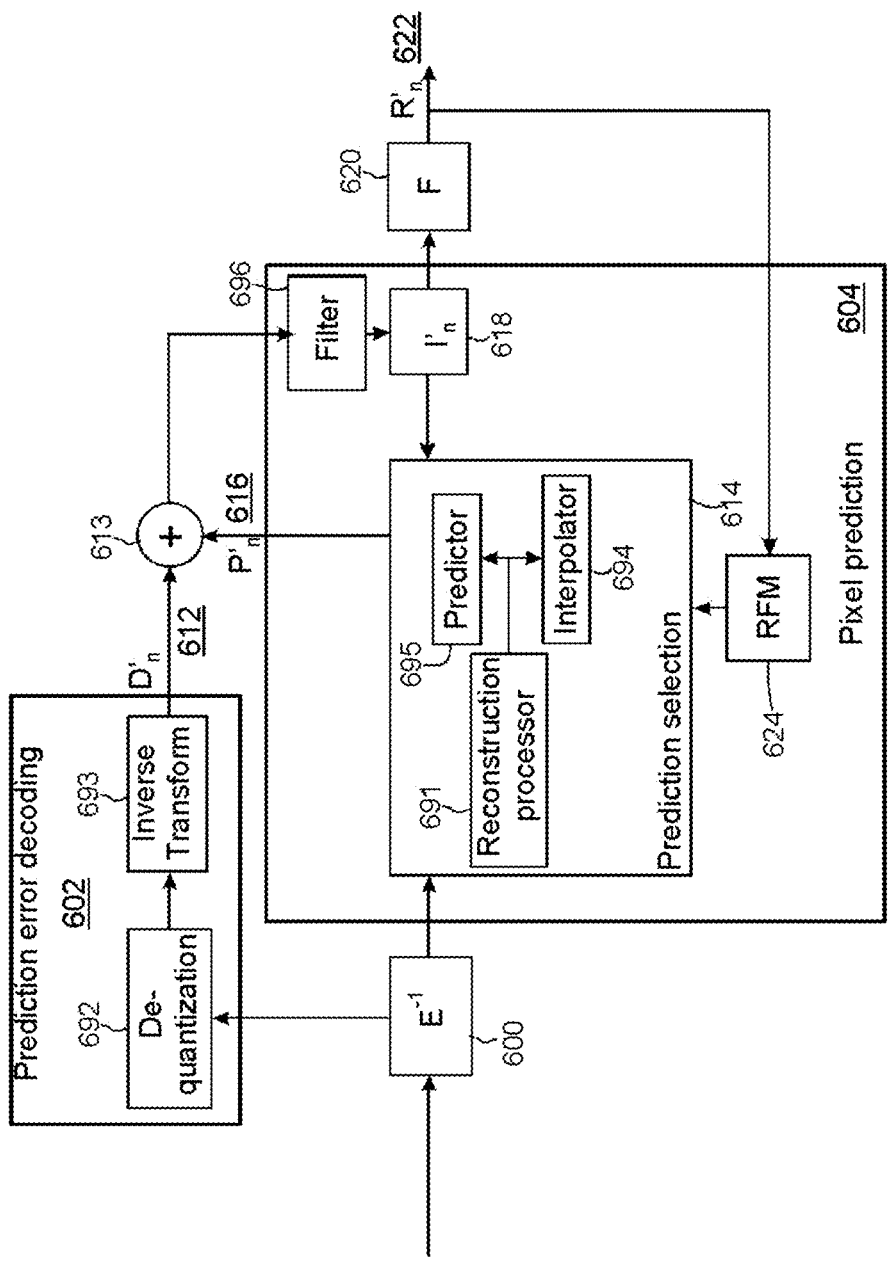
FIG. 13 shows a schematic diagram of a decoder according to some other embodiments of the invention.

In some embodiments the method can be applied to blocks that are transform coded and then inverse transform coded. An example of the encoder utilizing the filtering after the transform coding—inverse transform coding chain is illustrated in FIG. 12. The intra-prediction filter 385 is positioned between the preliminary reconstructor 339 and the preliminary reconstructed image store 314. The corresponding decoder is depicted in FIG. 13, in which the intra-prediction filter 696 is positioned between the first combiner 613 and the preliminary reconstructed image store 618.

The embodiments of the invention described above describe the codec in terms of separate encoder and decoder apparatus in order to assist the understanding of the processes involved. However, it would be appreciated that the apparatus, structures and operations may be implemented as a single encoder-decoder apparatus/structure/operation. Furthermore in some embodiments of the invention the coder and decoder may share some or all common elements.

Although the above examples describe embodiments of the invention operating within a codec within an electronic device, it would be appreciated that the invention as described below may be implemented as part of any video codec. Thus, for example, embodiments of the invention may be implemented in a video codec which may implement video coding over fixed or wired communication paths.

Thus, user equipment may comprise a video codec such as those described in embodiments of the invention above.

It shall be appreciated that the term user equipment is intended to cover any suitable type of wireless user equipment, such as mobile telephones, portable data processing devices or portable web browsers.

Furthermore elements of a public land mobile network (PLMN) may also comprise video codecs as described above.

In general, the various embodiments of the invention may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this invention may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions. The software may be stored on such physical media as memory chips, or memory blocks implemented within the processor, magnetic media such as hard disk or floppy disks, and optical media such as for example DVD and the data variants thereof, CD.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

An apparatus according to a first embodiment comprises:
 a. a first input adapted to receive angularity information;
 b. a second input adapted to receive pixel values for filtering; and c. a filtering element adapted to perform filtering of the selected pixel values;
d. a coefficient selector adapted to adapt the filtering on the basis of the angularity.

In some embodiments the coefficient selector is adapted to select a filter algorithm for the filtering element.

In some embodiments the coefficient selector is further adapted to select one or more coefficients for the filtering element.

The apparatus of the first embodiment may further comprise one or more thresholds, wherein the coefficient selector is adapted to compare the angularity with said one or more thresholds to adapt the filtering.

In some embodiments the received pixel values are intra-predicted pixel values.

In some embodiments the angularity also indicates whether the intra-prediction used to obtain the intra-predicted pixel values is a horizontal prediction or a vertical prediction.

In some embodiments the angularity is between −45 degrees and 45 degrees with respect to a horizontal or a vertical direction.

In some embodiments the filtering element uses an N-tap filter.

In some embodiments the adaptation comprises selecting values for at least one of the following:
a filter tap,
a filter offset.

In some embodiments the pixel values for filtering are pixels of the row or column of the current block closest to an already encoded neighboring block.

In some embodiments the pixel values for filtering are pixels of the column of the current block closest to an already encoded neighboring block, if the intra-prediction is vertical prediction.

In some embodiments the pixel values for filtering are pixels of the row of the current block closest to an already encoded neighboring block, if the intra-prediction is horizontal prediction.

In some embodiments the pixel values for filtering are intra-predicted pixels which have been transform coded and inverse transform coded before the filtering.

In some embodiments the filtering element is adapted to perform the filtering as follows:

$$P(0, y)=((8-Td) \cdot p(0, y)+Td \cdot p(-1, y+Fd)+4)>>3,$$

in which y=0, ..., N−1 for vertical prediction modes;

$$P(x, 0)=((8-Td) \cdot p(x, 0)+Td \cdot p(x+Fd, -1)+4)>>3,$$

in which x=0, ..., M−1 for horizontal prediction modes; and
P denotes the output samples of the filtering and p denotes the pixels to be filtered, N denotes the height of the block and M denotes the width of the block in pixels.

A method according to a second embodiment comprises:
a. receiving angularity information;
b. receiving pixel values for filtering by a filter; and
c. adapting the filter on the basis of the angularity;
d. filtering the pixels values by the adapted filter.

In some embodiments the method comprises selecting a filter algorithm for the filtering.

In some embodiments the method comprises selecting one or more coefficients for filtering.

The method of the second embodiment may further comprise comparing the angularity with one or more thresholds to adapt the filtering.

In some embodiments the received pixel values are intra-predicted pixel values.

In some embodiments the angularity also indicates whether the intra-prediction used to obtain the intra-predicted pixel values is a horizontal prediction or a vertical prediction.

In some embodiments the angularity is between −45 degrees and 45 degrees with respect to a horizontal or a vertical direction.

In some embodiments the filtering uses an N-tap filter.

In some embodiments the adaptation comprises selecting values for at least one of the following:
a filter tap,
a filter offset.

In some embodiments the pixel values for filtering are pixels of the row or column of the current block closest to an already encoded neighboring block.

In some embodiments the pixel values for filtering are pixels of the column of the current block closest to an already encoded neighboring block, if the intra-prediction is vertical prediction.

In some embodiments the pixel values for filtering are pixels of the row of the current block closest to an already encoded neighboring block, if the intra-prediction is horizontal prediction.

In some embodiments the pixel values for the filtering are intra-predicted pixels which have been transform coded and inverse transform coded before the filtering.

In some embodiments the filtering is performed as follows:

$$P(0, y)=((8-Td) \cdot p(0, y)+Td \cdot p(-1, y+Fd)+4)>>3,$$

in which y=0, ..., N−1 for vertical prediction modes;

$$P(x, 0)=((8-Td) \cdot p(x, 0)+Td \cdot p(x+Fd, -1)+4)>>3,$$

in which x=0, ..., M−1 for horizontal prediction modes; and
P denotes the output samples of the filtering and p denotes the pixels to be filtered, N denotes the height of the block and M denotes the width of the block in pixels.

According to a third embodiment there is provided a computer readable storage medium stored with code thereon for use by an apparatus, which when executed by a processor, causes the apparatus to perform:
a. receive angularity information;
b. receive pixel values for filtering by a filter; and
c. adapt the filter on the basis of the angularity;
d. filter the pixels values by the adapted filter.

According to a fourth embodiment there is provided at least one processor and at least one memory, said at least one memory stored with code thereon, which when executed by said at least one processor, causes an apparatus to perform:
a. receive angularity information;
b. receive pixel values for filtering by a filter; and
c. adapt the filter on the basis of the angularity;
d. filter the pixels values by the adapted filter.

In some embodiments said at least one memory stored with code thereon, which when executed by said at least one processor, causes the apparatus to select a filter algorithm for the filtering.

In some embodiments said at least one memory stored with code thereon, which when executed by said at least one processor, causes the apparatus to select one or more coefficients for filtering.

The at least one memory stored with code thereon, which when executed by said at least one processor, may further cause the apparatus to compare the angularity with one or more thresholds to adapt the filtering.

In some embodiments the received pixel values are intra-predicted pixel values.

In some embodiments the angularity also indicates whether the intra-prediction used to obtain the intra-predicted pixel values is a horizontal prediction or a vertical prediction.

In some embodiments the angularity is between −45 degrees and 45 degrees with respect to a horizontal or a vertical direction.

In some embodiments the filter is an N-tap filter.

In some embodiments the adaptation comprises selecting values for at least one of the following:
a filter tap,
a filter offset.

In some embodiments the pixel values for filtering are pixels of the row or column of the current block closest to an already encoded neighboring block.

In some embodiments the pixel values for filtering are pixels of the column of the current block closest to an already encoded neighboring block, if the intra-prediction is vertical prediction.

In some embodiments the pixel values for filtering are pixels of the row of the current block closest to an already encoded neighboring block, if the intra-prediction is horizontal prediction.

In some embodiments the pixel values for the filtering are intra-predicted pixels which have been transform coded and inverse transform coded before the filtering.

In some embodiments said at least one memory stored with code thereon, which when executed by said at least one processor, causes the apparatus to perform the filtering as follows:

$P(0, y) = ((8-Td) \cdot p(0, y) + Td \cdot p(-1, y+Fd) + 4) >> 3$, in which y=0, . . . , N−1 for vertical prediction modes;

$P(x, 0) = ((8-Td) \cdot p(x, 0) + Td \cdot p(x+Fd, -1) + 4) >> 3$, in which x=0, . . . , M−1 for horizontal prediction modes; and P denotes the output samples of the filtering and p denotes the pixels to be filtered, N denotes the height of the block and M denotes the width of the block in pixels.

An apparatus according to a fifth embodiment comprises:
a. means for receiving angularity information;
b. means for receiving pixel values for filtering; and
c. means for filtering the selected pixel values;
d. means for adapting the filtering on the basis of the angularity.

An encoder according to a sixth embodiment comprises:
a. a first input adapted to receive angularity information;
b. a second input adapted to receive pixel values for filtering; and
c. a filtering element adapted to perform filtering of the selected pixel values;
d. a coefficient selector adapted to adapt the filtering on the basis of the angularity.

A decoder according to a seventh embodiment comprises:
a. a first input adapted to receive angularity information;
b. a second input adapted to receive pixel values for filtering; and
c. a filtering element adapted to perform filtering of the selected pixel values;
d. a coefficient selector adapted to adapt the filtering on the basis of the angularity.

We claim:

1. An apparatus comprising:
a first input adapted to receive angularity information, wherein angularity is a direction of a spatial intra-prediction;
a second input adapted to receive pixel values for filtering, said pixel values being selected based on the angularity information and including at least a first pixel value, said first pixel value being an output of a transform coding or decoding operation, and a second pixel value, said second pixel value being an output of a sample prediction process;
a filtering element adapted to perform filtering of at least said second pixel value based on at least said first and second pixel values; and
a coefficient selector adapted to adapt the filtering on the basis of the angularity.

2. The apparatus according to claim 1, wherein the coefficient selector is adapted to select a filter algorithm for the filtering element.

3. The apparatus according to claim 1, wherein the coefficient selector is further adapted to select one or more coefficients for the filtering element.

4. The apparatus according to claim 1, wherein the adaptation comprises selecting values for at least one of the following:
a filter tap; and
a filter offset.

5. A method comprising:
receiving angularity information, wherein angularity is a direction of a spatial intra-prediction;
receiving pixel values for filtering by a filter, said pixel values being selected based on the angularity information and including at least a first pixel value, said first pixel value being an output of a transform coding or decoding operation, and a second pixel value, said second pixel value being an output of a sample prediction process;
adapting the filter on the basis of the angularity; and
filtering at least said second pixel value based on at least said first and second pixel values,
wherein the method is carried out by a decoder for reconstructing image blocks received from an electronic device having a video coder.

6. The method according to claim 5 comprising selecting a filter algorithm for the filtering.

7. The method according to claim 5 comprising selecting one or more coefficients for filtering.

8. The method according to claim 5, the adaptation comprising selecting values for at least one of the following:
a filter tap; and
a filter offset.

9. A computer program product comprising a non-transitory computer readable storage medium bearing computer program code embodied therein for use with a computer, the computer program code comprising code for performing:
receiving angularity information, wherein angularity is a direction of a spatial intra-prediction;
receiving pixel values for filtering by a filter, said pixel values being selected based on the angularity information and including at least a first pixel value, said first pixel value being an output of a transform coding or decoding operation, and a second pixel value, said second pixel value being an output of a sample prediction process;
adapting the filter on the basis of the angularity; and filtering at least said second pixel value based on at least said first and second pixel values.

10. An apparatus comprising:
at least one processor; and
at least one memory including computer program code, said at least one memory and the computer program code configured, with said at least one processor, to cause the apparatus to perform:
receive angularity information, wherein angularity is a direction of a spatial intra-prediction;
receive pixel values for filtering by a filter, said pixel values being selected based on the angularity information and including at least a first pixel value, said first pixel value being an output of a transform coding or decoding operation, and a second pixel value, said second pixel value being an output of a sample prediction process;
adapt the filter on the basis of the angularity; and
filter at least said second pixel value based on at least said first and second pixel values.

11. The apparatus according to claim 10, wherein said at least one memory and said computer program code are further configured, with said at least one processor, to cause the apparatus to select a filter algorithm for the filtering.

12. The apparatus according to claim 10, wherein said at least one memory and said computer program code are further configured, with said at least one processor, to cause the apparatus to select one or more coefficients for filtering.

13. The apparatus according to claim 10, wherein said at least one memory and said computer program code are further configured, with said at least one processor, to cause the apparatus to compare the angularity with one or more thresholds to adapt the filtering.

14. The apparatus according to claim 10, wherein adapt the filter comprises selecting values for at least one of the following:
a filter tap; and
a filter offset.

* * * * *